(12) United States Patent
Zhang et al.

(10) Patent No.: US 11,494,877 B2
(45) Date of Patent: Nov. 8, 2022

(54) SYSTEMS AND METHODS FOR IMAGE RECONSTRUCTION

(71) Applicant: SHANGHAI UNITED IMAGING INTELLIGENCE CO., LTD., Shanghai (CN)

(72) Inventors: Yang Zhang, Shanghai (CN); Yang Lyu, Shanghai (CN); Chen Xi, Shanghai (CN)

(73) Assignee: SHANGHAI UNITED IMAGING INTELLIGENCE CO., LTD., Shanghai (CN)

(*) Notice: Subject to any disclaimer, the term of this patent is extended or adjusted under 35 U.S.C. 154(b) by 231 days.

(21) Appl. No.: 16/726,964

(22) Filed: Dec. 26, 2019

(65) Prior Publication Data
US 2020/0211160 A1 Jul. 2, 2020

(30) Foreign Application Priority Data
Dec. 26, 2018 (CN) .......................... 201811602836.3

(51) Int. Cl.
G06T 5/00 (2006.01)
G06N 3/04 (2006.01)
G06T 11/00 (2006.01)

(52) U.S. Cl.
CPC ............ *G06T 5/001* (2013.01); *G06N 3/0454* (2013.01); *G06T 11/008* (2013.01); *G06T 2207/10104* (2013.01); *G06T 2207/20084* (2013.01)

(58) Field of Classification Search
CPC ........ G06N 3/0454; G06T 2207/20084; G06T 5/001
See application file for complete search history.

(56) References Cited

U.S. PATENT DOCUMENTS 9,202,267 B1* 12/2015 Yang .......................... G06T 5/20
2015/0154767 A1    6/2015 Liu
2017/0071562 A1*  3/2017 Suzuki ................. A61B 6/5205
2017/0293825 A1* 10/2017 Shao .................... G06V 30/194
(Continued)

FOREIGN PATENT DOCUMENTS

CN    102184559 A    9/2011
CN    104700438 A    6/2015
(Continued)

OTHER PUBLICATIONS

X. Sun and X. Wang, "Study of edge detection algorithms for lung CT image on the basis of MATLAB," 2011 Chinese Control and Decision Conference (CCDC), 2011, pp. 810-813, doi: 10.1109/CCDC.2011.5968293. (Year: 2011).*
(Continued)

Primary Examiner — Ross Varndell
(74) Attorney, Agent, or Firm — Metis IP LLC

(57) ABSTRACT

The present disclosure provides a system for image reconstruction. The system may obtain an initial image of a subject. The initial image may be generated based on scan data of the subject that is collected by an imaging device. The system may also generate a gradient image associated with the initial image. The system may further generate a target image of the subject by applying an image reconstruction model based on the initial image and the gradient image. The target image may have a higher image quality than the initial image.

20 Claims, 15 Drawing Sheets

(56) References Cited

U.S. PATENT DOCUMENTS

2018/0089864 A1* 3/2018 Gindele .............. A61B 6/5205
2020/0034948 A1* 1/2020 Park .................... G06N 3/0481

FOREIGN PATENT DOCUMENTS

| CN | 106600568 A | 4/2017 |
|---|---|---|
| CN | 107610194 A | 1/2018 |
| CN | 108122265 A | 6/2018 |
| CN | 108376386 A | 8/2018 |
| CN | 108564553 A | 9/2018 |
| CN | 108710950 A | 10/2018 |
| CN | 108898582 A | 11/2018 |
| CN | 109697740 A | 4/2019 |

OTHER PUBLICATIONS

K. Kim et al., Penalized PET Reconstruction Using Deep Learning Prior and Local Linear Fitting, IEEE Transactions on Medical Imaging, 37(6): 1478-1487, 2018.

J. Bland et al., MR-Guided Kernel EM Reconstruction for Reduced Dose PET Imaging, IEEE Transactions on Radiation & Plasma Medical Sciences, 2(3): 235-243, 2018.

Lei Xiang et al., Deep Auto-context Convolutional Neural Networks for Standard-Dose PET Image Estimation from Low-Dose PET/MRI, Neurocomputing, 267: 406-416, 2017.

Yan Wang et al., Semi-Supervised Tripled Dictionary Learning for Standard-dose PET Image Prediction Using Low-dose PET and Multimodal MRI, IEEE Transactions on Biomedical Engineering, 64(3): 569-579, 2017.

L. B. Chavez-Rivera et al., ML-EM Reconstruction Model Including Total Variation for Low Dose PET High Resolution Data, IEEE Nuclear Science Symposium and Medical Imaging Conference, 2015, 5 pages.

Jiayin Kang et al., Prediction of Standard-Dose PET Image by Low-Dose PET and MRI Images, 280-289, 2014.

Kaiming He et al., Deep Residual Learning for Image Recognition, CVPR, 770-778, 2015.

Gao Huang et al., Densely Connected Convolutional Networks, CVPR, 4700-4708, 2017.

N. Srivastava et al., Dropout: A Simple Way to Prevent Neural Networks from Overfitting, Journal of Machine Learning Research, 15: 1929-1958, 2014.

S. J. Hanson et al., Comparing Biases for Minimal Network Construction with Back-Propagation, In Proceedings of the 1st International Conference an Neural Information Processing Systems,177-185, 1988.

International Search Report in PCT/CN2019/128853 dated Apr. 2, 2020, 5 pages.

Written Opinion in PCT/CN2019/128853 dated Apr. 2, 2020, 5 pages.

Chanchan Dong et al., The MLEM Low-Dose CT Reconstruction Algorithm Based on Improved Anisotropic Diffusion and Wavelet Transform, Journal of North University of China (Natural Science Edition), 36(4): 488-494, 2015.

Juanxiu Tian et al., Deep Learning in Medical Image Analysis and Its Challenges, Acta Automatica Sinica, 44(3): 401-424, 2018.

Yang Xin et al., Degradation model and neighbor embedding based color image adaptive super-resolution reconstruction, Journal of Southeast University(Natural Science Edition), 41(6): 1193-1196, 2011.

* cited by examiner

500

┌─────────────────────────────────────────────────────────┐
│ Obtaining an initial image of a subject, the initial image being    │ ⟋510
│ generated based on scan data of the subject that is collected by    │
│ an imaging device                                                    │
└─────────────────────────────────────────────────────────┘
                              ▼
┌─────────────────────────────────────────────────────────┐
│                                                                      │ ⟋520
│ Generating a gradient image associated with the initial image       │
│                                                                      │
└─────────────────────────────────────────────────────────┘
                              ▼
┌─────────────────────────────────────────────────────────┐
│ Generating, based on the initial image and the gradient image, a    │ ⟋530
│ target image of the subject by applying an image reconstruction     │
│ model, the target image having a higher image quality than the      │
│ initial image                                                        │
└─────────────────────────────────────────────────────────┘

FIG. 5

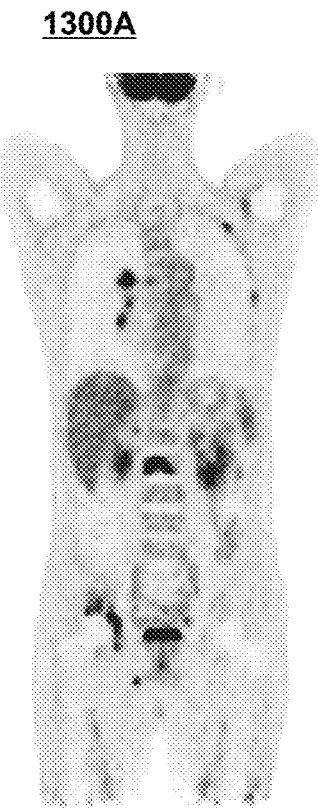
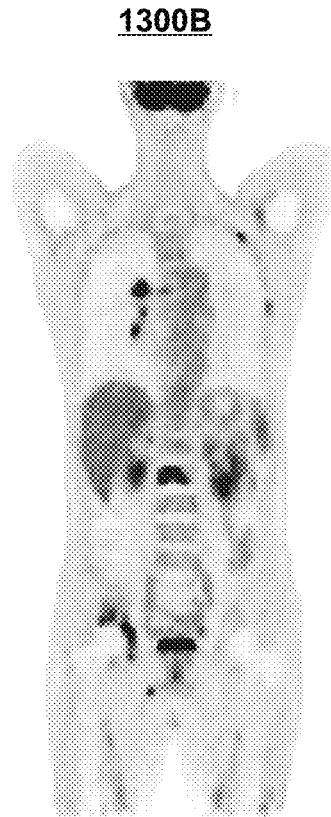
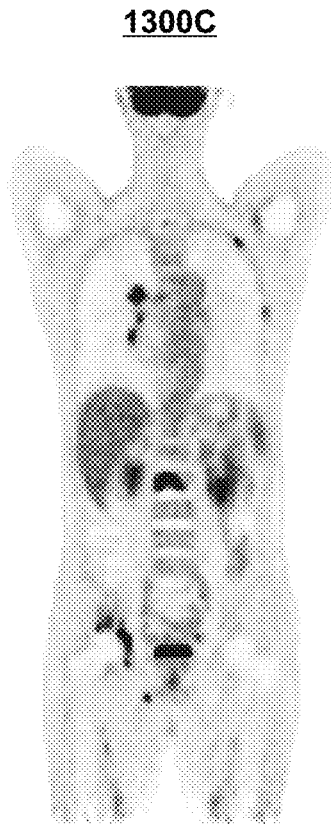
FIG. 13A
FIG. 13B
FIG. 13C

SYSTEMS AND METHODS FOR IMAGE RECONSTRUCTION

CROSS-REFERENCE TO RELATED APPLICATIONS

This application claims priority of Chinese Patent Application No. 201811602836.3, filed on Dec. 26, 2018, the contents of which are hereby incorporated by reference.

TECHNICAL FIELD

The disclosure generally relates to image processing, and more particularly, relates to systems and methods for image reconstruction.

BACKGROUND

Medical imaging, such as positron emission tomography (PET) and computed tomography (CT), is widely used in disease diagnosis and/or treatment for various medical conditions (e.g., tumors, coronary heart diseases, or brain disease). Image reconstruction is a key technology used in the field of medical imaging to transform scan data of a subject (e.g., a patient) into an image of the subject. The image quality (e.g., measured by an image resolution and/or a noise level) of the resulting image may be affected by various factors, such as the dose of radiation applied to the subject, the scan time, a motion of the subject during the scan, or the like, or any combination thereof. In some occasions, in order to improve the image quality of the resulting image, the scan of the subject may need to be performed under a restricted condition, for example, with a sufficiently high radiation dose, a sufficiently long scan time, the subject holding breath, or the like. However, this may cause more radiation damage to the subject and/or reduce the scanning efficiency. Merely by way of example, a PET scan with a standard PET dose may be performed at a speed of about 3 minutes/table position, while a PET scan with half of the standard PET dose may need to be performed about 6 minutes/table position, which may increase the scan time and result in a patient movement in scan. Therefore, it is desired to provide systems and methods for image reconstruction, thereby improving the image quality, reducing the radiation damage, and/or improving the scanning efficiency.

SUMMARY

According to one aspect of the present disclosure, a system for image reconstruction is provided. The system may include at least one storage device including a set of instructions, and at least one processor configured to communicate with the at least one storage device. When executing the set of instructions, the at least one processor may be configured to direct the system to obtain an initial image of a subject. The initial image may be generated based on scan data of the subject that is collected by an imaging device. The at least one processor may also be configured to direct the system to generate a gradient image associated with the initial image. The at least one processor may further be configured to direct the system to generate a target image of the subject by applying an image reconstruction model based on the initial image and the gradient image. The target image may have a higher image quality than the initial image.

In some embodiments, each of the initial image and the gradient image may be a 3-dimensional (3D) image. The generating a target image of the subject based on the initial image and the gradient image by applying an image reconstruction model may include extracting at least one first 2-dimensional (2D) image from the initial image, and extracting at least one second 2D image from the gradient image. The generating a target image of the subject based on the initial image and the gradient image by applying an image reconstruction model may further include generating the target image by applying the image reconstruction model based on the at least one first 2D image and the at least one second 2D image.

In some embodiments, the at least one first 2D image may include at least one first axial image, at least one first sagittal image, and at least one first coronary image extracted from the initial image. The at least one second 2D image includes at least one second axial image, at least one second sagittal image, and at least one second coronary image extracted from the gradient image.

In some embodiments, the generating the target image based on the at least one first 2D image and the at least one second 2D image by applying the image reconstruction model may include generating a first concatenated image by concatenating the at least one first axial image and the at least one second axial image, generating a second concatenated image by concatenating the at least one first sagittal image and the at least one second sagittal image, and generating a third concatenated image by concatenating the at least one first coronary image and the at least one second coronary image. The generating the target image based on the at least one first 2D image and the at least one second 2D image by applying the image reconstruction model may further include generating the target image by applying the image reconstruction model on the first concatenated image, the second concatenated image, and the third concatenated image.

In some embodiments, the image reconstruction model may include an axial view component, a sagittal view component, a coronary view component, and an integration component. The axial view component may be configured to generate a first feature map by processing the first concatenated image. The sagittal view component may be configured to generate a second feature map by processing the second concatenated image. The coronary view component may be configured to generate a third feature map by processing the third concatenated image. The integration component may be configured to generate an output image by processing the first feature map, the second feature map, and the third feature map. The target image may be generated based on the output image of the integration component.

In some embodiments, the image reconstruction model may be a trained cascaded neural network including a plurality of trained models that are sequentially connected. The plurality of trained models may include a trained first model and one or more trained second models downstream to the trained first model. The generating the target image by applying the image reconstruction model on the at least one first 2D image and the at least one second 2D image may include obtaining an output image of the trained first model by inputting the at least one first 2D image and the at least one second 2D image into the trained first model. For each of the one or more trained second model, the generating the target image by applying the image reconstruction model on the at least one first 2D image and the at least one second 2D image may include extracting at least one third 2D image from an output image of a previous trained model connected to the trained second model, and obtaining an output image of the trained second model by inputting the at least one first 2D image, the at least one second 2D image, and the at least one third 2D image into the trained second model. The target image may be generated based on an output image of the last trained second model of the trained cascaded neural network.

In some embodiments, the scan data of the initial image may correspond to a first radiation dose associated with the subject, and the target image may correspond to a second radiation dose higher than the first radiation dose.

In some embodiments, the image reconstruction model may correspond to a target image resolution. The initial image may have an image resolution different from the target image resolution. The at least one processor may be configured to direct the system to generate a resampled initial image having the target image resolution by resampling the initial image. The at least one processor may also be configured to direct the system to generate a preprocessed initial image by normalizing the resampled initial image, and generate a preprocessed gradient image by normalizing the gradient image. The generating the target image of the subject by applying the image reconstruction model based on the initial image and the gradient image may include generating the target image of the subject by applying the image reconstruction model based on the preprocessed initial image and the preprocessed gradient image.

In some embodiments, the image quality may relate to at least one of an image resolution, a noise level, a contrast ratio, or a sharpness.

In some embodiments, the image reconstruction model may be configured to reduce noise in the initial image.

In some embodiments, the image reconstruction model may include a neural network model.

According to another aspect of the present disclosure, a system for generating an image reconstruction model is provided. The system may include at least one storage device including a set of instructions, and at least one processor configured to communicate with the at least one storage device. When executing the set of instructions, the at least one processor may be configured to direct the system to obtain a plurality of training samples and a preliminary model. Each of the plurality of training samples may include a sample initial image of a sample subject, a sample gradient image associated with the sample initial image, and a sample target image of the sample subject. The sample target image may have a higher image quality than the sample initial image. The at least one processor may be configured to direct the system to generate the image reconstruction model by training the preliminary model using the plurality of training sample.

In some embodiments, the generating the image reconstruction model by the training the preliminary model using the plurality of training samples may include, for each of the plurality of training samples, extracting at least one sample first 2D image from the sample initial image of the training sample, and extracting at least one sample second 2D image from the sample gradient image of the training sample. The generating the image reconstruction model by the training the preliminary model using the plurality of training samples may further include generating the image reconstruction model by training the preliminary model using the at least one sample first 2D image, the at least one sample second 2D image, and the sample target image of each of the plurality of training samples.

In some embodiments, for each of plurality of the training samples, the at least one sample first 2D image may include at least one sample first axial image, at least one sample first sagittal image, and at least one sample first coronary image extracted from the sample initial image of the training sample. For each of plurality of the training samples, the at least one sample second 2D image may include at least one sample second axial image, at least one sample second sagittal image, and at least one sample second coronary image extracted from the sample gradient image of the training sample.

In some embodiments, the training the preliminary model may include, for each of the plurality of training samples, generating a sample first concatenated image by concatenating the at least one sample first axial image and the at least one sample second axial image of the training sample, generating a sample second concatenated image by concatenating the at least one sample first sagittal image and the at least one sample second sagittal image of the training sample, and generating a sample third concatenated image by concatenating the at least one sample first coronary image and the at least one sample second coronary image of the training sample. The training the preliminary model may further include training the preliminary model using the sample first concatenated image, the sample second concatenated image, the sample third concatenated image, and the sample target image of each of the plurality of training samples.

In some embodiments, the preliminary model may include a first component, a second component, a third component, and a fourth component. The first component may be configured to generate a sample first feature map by processing the sample first concatenated image of each of the plurality of training samples. The second component may be configured to generate a sample second feature map by processing the sample second concatenated image of each of the plurality of training samples. The third component may be configured to generate a sample third feature map by processing the sample third concatenated image of each of the plurality of training samples. The fourth component may be configured to process the sample first feature map, the sample second feature map, and the sample third feature map of each of the plurality of training samples.

In some embodiments, the preliminary model may be a cascaded neural network including a plurality of models that are sequentially trained. The plurality of models may include a first model and one or more second models downstream to the first model. The training the preliminary model may include, for each of the plurality of training samples, training the first model using the at least one sample first 2D image, the at least one sample second 2D image, and the sample target image of the training sample. For each of the one or more second models, training the preliminary model may include, for each of the plurality of training samples, obtaining a sample output image by inputting the at least one sample first 2D image and the at least one sample second 2D image of the training sample into the one or more trained models that are generated before training the second model, and extracting at least one sample third 2D image from the sample output image corresponding to the training sample. For each of the one or more second models, training the preliminary model may include, for each of the plurality of training samples, training the second model using the at least one sample first 2D image, the at least one sample second 2D image, the at least one sample third 2D image, and the sample target image of the training sample.

In some embodiments, for each of the plurality of training samples, the corresponding sample initial image may be generated based on first scan data that is collected by a sample imaging device and correspond to a first radiation dose associated with the sample subject. For each of the plurality of training samples, the corresponding sample target image may be generated based on second scan data that is collected by the sample imaging device and correspond to a second radiation dose associated with the sample subject. For each of the plurality of training samples, the second radiation dose may be higher than the first radiation dose.

In some embodiments, the image quality may relate to at least one of an image resolution, a noise level, a contrast ratio, or a sharpness.

In some embodiments, the generating the image reconstruction model by training the preliminary model using the plurality of training samples may include preprocessing the plurality of training samples, and generating the image reconstruction model based on the plurality of preprocessing training samples.

In some embodiments, the image reconstruction model may include a neural network model.

In some embodiments, the image reconstruction model may include at least one of a fully convolutional block, a skip-connection, a residual block, or a dense block.

According to another aspect of the present disclosure, a method for image reconstruction is provided. The method may include obtaining an initial image of a subject, the initial image being generated based on scan data of the subject that is collected by an imaging device. The method may also include generating a gradient image associated with the initial image. The method may further include generating a target image of the subject by applying an image reconstruction model based on the initial image and the gradient image. The target image having a higher image quality than the initial image.

According to another aspect of the present disclosure, a method for generating an image reconstruction model is provided. The method may include obtaining a plurality of training samples and a preliminary model. Each of the plurality of training samples may include a sample initial image of a sample subject, a sample gradient image associated with the sample initial image, and a sample target image of the sample subject. The sample target image may have a higher image quality than the sample initial image. The method may further include generating the image reconstruction model by training the preliminary model using the plurality of training samples.

According to another aspect of the present disclosure, a non-transitory computer-readable storage medium including instructions is provided. When accessed by at least one processor of a system for image reconstruction, the instructions may cause the system to perform a method. The method may include obtaining an initial image of a subject, the initial image being generated based on scan data of the subject that is collected by an imaging device. The method may also include generating a gradient image associated with the initial image. The method may further include generating a target image of the subject by applying an image reconstruction model based on the initial image and the gradient image. The target image having a higher image quality than the initial image.

According to another aspect of the present disclosure, a non-transitory computer-readable storage medium including instructions is provided. When accessed by at least one processor of a system for generating an image reconstruction model, the instructions may cause the system to perform a method. The method may include obtaining a plurality of training samples and a preliminary model. Each of the plurality of training samples may include a sample initial image of a sample subject, a sample gradient image associated with the sample initial image, and a sample target image of the sample subject. The sample target image may have a higher image quality than the sample initial image. The method may further include generating the image reconstruction model by training the preliminary model using the plurality of training samples.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein:

FIG. 5 is a flowchart illustrating an exemplary process for generating a target image of a subject based on an initial image of a subject according to some embodiments of the present disclosure;

FIG. 13A is a schematic diagram illustrating an exemplary sample initial image according to some embodiments of the present disclosure;

FIG. 13B is a schematic diagram illustrating an exemplary predicted target image according to some embodiments of the present disclosure;

FIG. 13C is a schematic diagram illustrating an exemplary sample target image according to some embodiments of the present disclosure;

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, sections or assembly of different levels in ascending order. However, the terms may be displaced by another expression if they achieve the same purpose.

Figure 2:
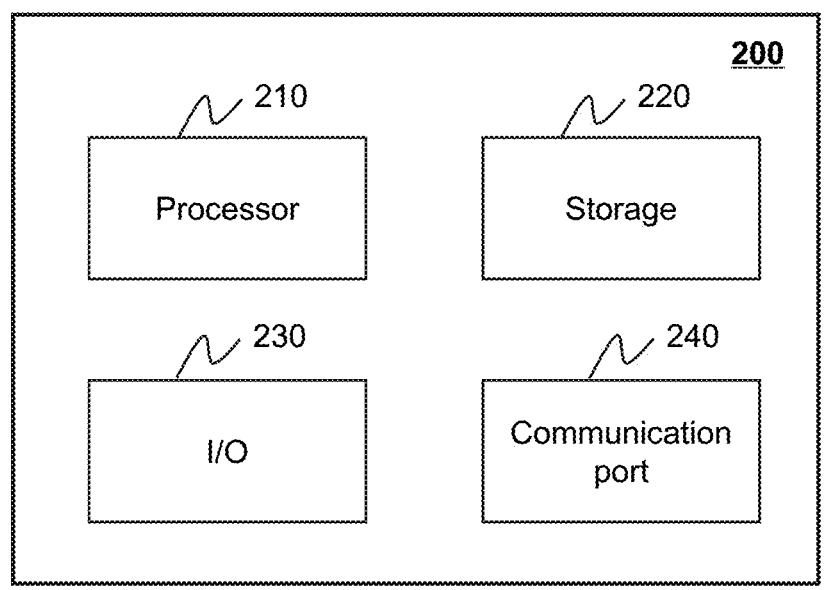
FIG. 2 is a schematic diagram illustrating hardware and/or software components of an exemplary computing device may be implemented according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items. The term "image" in the present disclosure is used to collectively refer to image data (e.g., scan data) and/or images of various forms, including a two-dimensional (2D) image, a three-dimensional (3D) image, a four-dimensional (4D) image, etc. The term "pixel" and "voxel" in the present disclosure are used interchangeably to refer to an element of an image.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Moreover, while the systems and methods disclosed in the present disclosure are described primarily regarding image reconstruction in a medical imaging system. It should be understood that this is only for illustration purposes. The systems and methods of the present disclosure may be applied to reconstruct image data acquired in different scenarios and/or for different purposes (e.g., safety monitoring, filming, or photography) and/or by different image acquisition devices (e.g., a digital camera, an analog camera, or a scanner).

For example, the systems and methods of the present disclosure may be applied to various imaging systems. In some embodiments, the imaging systems may include a single modality imaging system and/or a multi-modality imaging system. The single modality imaging system may include, for example, an ultrasound imaging system, an X-ray imaging system, an computed tomography (CT) system, a magnetic resonance imaging (MRI) system, an ultrasonography system, a positron emission tomography (PET) system, an optical coherence tomography (OCT) imaging system, an ultrasound (US) imaging system, an intravascular ultrasound (IVUS) imaging system, a near infrared spectroscopy (NIRS) imaging system, or the like, or any combination thereof. The multi-modality imaging system may include, for example, an X-ray imaging-magnetic resonance imaging (X-ray-MRI) system, a positron emission tomography-X-ray imaging (PET-X-ray) system, a single photon emission computed tomography-magnetic resonance imaging (SPECT-MRI) system, a positron emission tomography-computed tomography (PET-CT) system, a C-arm system, a digital subtraction angiography-magnetic resonance imaging (DSA-MRI) system, etc. It should be noted that the imaging system described below is merely provided for illustration purposes, and not intended to limit the scope of the present disclosure.

The term "imaging modality" or "modality" as used herein broadly refers to an imaging method or technology that gathers, generates, processes, and/or analyzes imaging information of a subject. The subject may include a biological subject and/or a non-biological subject. The biological subject may be a human being, an animal, a plant, or a portion thereof (e.g., a cell, a tissue, an organ, etc.). In some embodiments, the subject may be a man-made composition of organic and/or inorganic matters that are with or without life.

An aspect of the present disclosure relates to systems and methods for image reconstruction. The systems and methods may acquire an initial image, wherein the initial image may be generated based on scan data of the subject that is collected by an imaging device. The systems and methods may generate a gradient image associated with the initial image. Based on the initial image and the gradient image, the systems and methods may generate a target image of the subject by application of an image reconstruction model. The target image may have a higher image quality than the initial image. For example, the target image may have a higher image resolution and/or a lower noise level than the initial image.

According to some embodiments of the present disclosure, the target image may be reconstructed based on the initial image with a relatively lower image quality by applying the image reconstruction model. Normally, an image of a same (or substantially same) quality as the target image may need to be generated based on scan data collected in a more restricted condition than the initial image (e.g., with a higher radiation dose, a longer scan time, the subject holding breath). This may cause more radiation damage to the subject and/or reduce the scanning efficiency. The systems and methods disclosed herein may be used to generate an image with improved quality without increasing radiation damage to the subject and/or without reducing the scanning efficiency.

In addition, in some embodiments, the image reconstruction model may be a neural network model that is trained using a machine learning technique. Using the image reconstruction model may further improve the reconstruction efficiency and/or the accuracy of the reconstruction result. Moreover, the gradient image associated with the initial image may be generated and used in reconstructing the target image. The gradient image may provide detail information (e.g., edge information) of the initial image, which may facilitate the recovery of image details of the initial image in generating the target image.

In some embodiments, the systems and methods may extract multi-view information (e.g., information in an axial view, a sagittal view, and/or a coronary view) from the initial image and the gradient image. The image reconstruction model may include multiple components for processing the multi-view information of the initial image and the gradient image. The target image reconstructed based on the multi-view information of the initial image and the gradient image may have a higher accuracy and/or reliability. Additionally or alternatively, in some embodiments, the image reconstruction model may be a trained cascaded neural network, and the reliability of the target image may be further improved by adopting a deep auto-context learning strategy.

Figure 1:
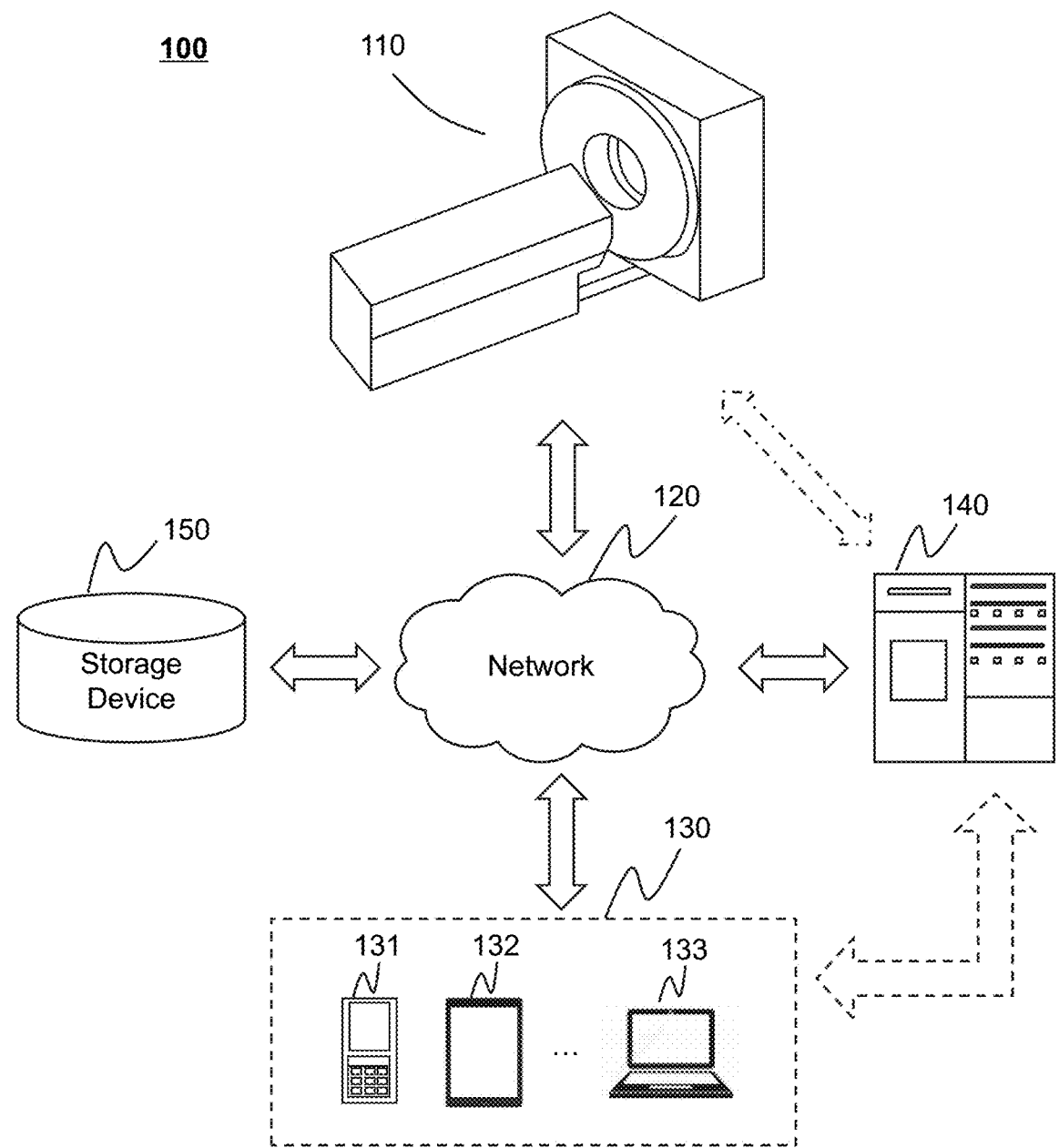
FIG. 1 is a schematic diagram illustrating an exemplary imaging system according to some embodiments of the present disclosure.

FIG. 1 is a schematic diagram illustrating an exemplary imaging system 100 according to some embodiments of the present disclosure. In some embodiments, the imaging system 100 may be a single-modality system (e.g., a PET system, a CT system) or a multi-modality system (e.g., a PET-CT system, a PET/MRI system) as described elsewhere in this disclosure. In some embodiments, the imaging system 100 may include modules and/or components for performing imaging and/or related analysis.

Merely by way of example, as illustrated in FIG. 1, the imaging system 100 may include an imaging device 110, a network 120, one or more terminals 130, a processing device 140, and a storage device 150. The components in the imaging system 100 may be connected in various ways. Merely by way of example, the imaging device 110 may be connected to the processing device 140 through the network 120 or directly as illustrated in FIG. 1. As another example, the terminal(s) 130 may be connected to the processing device 140 via the network 120 or directly as illustrated in FIG. 1.

The imaging device 110 may be configured to acquire imaging data relating to a subject. The imaging data relating to a subject may include a 2D image (e.g., a slice image), a 3D image, a 4D image (e.g., a series of 3D images over time), and/or any related image data (e.g., scan data, projection data), or the like. The subject may be biological or non-biological. For example, the subject may include a patient, a man-made object, etc. As another example, the subject may include a specific portion, organ, and/or tissue of the patient. For example, the subject may include the head, the neck, the thorax, the heart, the stomach, a blood vessel, soft tissue, a tumor, nodules, or the like, or any combination thereof.

In some embodiments, the imaging device 110 may include a PET device. The PET device may scan the subject or a portion thereof that is located within its detection region and generate projection data relating to the subject or the portion thereof. The PET device may include a gantry, a detector, an electronics module, and/or other components not shown. The gantry may support one or more parts of the PET device, for example, the detector, the electronics module, and/or other components. The detector may detect radiation photons (e.g., γ photons) emitted from the subject being examined. The electronics module may collect and/or process electrical signals (e.g., scintillation pulses) generated by the detector. The electronics module may convert an analog signal (e.g., an electrical signal generated by the detector) relating to a radiation photon detected by the detector to a digital signal relating to a radiation event. As used herein, a radiation event may refer to an interaction between a radiation photon emitted from a subject and impinging on and detected by the detector. A pair of radiation photons (e.g., y photons) interacting with two detector blocks along a line of response (LOR) within a coincidence time window may be determined as a coincidence event. A portion of the radiation photons (e.g., y photons) emitted from a subject being examined may interact with tissue in the subject. The radiation photons (e.g., y photons) interacting with tissue in the subject may be scattered or otherwise change its trajectory, that may affect the number or count of radiation photons (e.g., y photons) detected by two detector blocks along a line of response (LOR) within a coincidence time window and the number or count of coincidence events. In some alternative embodiments, the imaging device 110 may include a PET/CT device or a PET/MRI device.

The processing device 140 may process data and/or information obtained from the imaging device 110, the terminal(s) 130, and/or the storage device 150. For example, the processing device 140 may reconstruct a target image of the subject by applying an image reconstruction model. As another example, the processing device 140 may generate the image reconstruction model by training a preliminary model using a plurality of training samples. In some embodiments, the generation and/or updating of the image reconstruction model may be performed on a processing device, while the application of the image reconstruction model may be performed on a different processing device. In some embodiments, the generation of the image reconstruction model may be performed on a processing device of a system different from the imaging system 100 or a server different from a server including the processing device 140 on which the application of the image reconstruction model is performed. For instance, the generation of the image reconstruction model may be performed on a first system of a vendor who provides and/or maintains such an image reconstruction model and/or has access to training samples used to generate the image reconstruction model, while image reconstruction based on the provided image reconstruction model may be performed on a second system of a client of the vendor. In some embodiments, the generation of the image reconstruction model may be performed online in response to a request for image reconstruction. In some embodiments, the generation of the image reconstruction model may be performed offline.

In some embodiments, the image reconstruction model may be generated and/or updated (or maintained) by, e.g., the manufacturer of the imaging device 110 or a vendor. For instance, the manufacturer or the vendor may load the image reconstruction model into the imaging system 100 or a portion thereof (e.g., the processing device 140) before or during the installation of the imaging device 110 and/or the processing device 140, and maintain or update the image reconstruction model from time to time (periodically or not). The maintenance or update may be achieved by installing a program stored on a storage device (e.g., a compact disc, a USB drive, etc.) or retrieved from an external source (e.g., a server maintained by the manufacturer or vendor) via the network 120. The program may include a new model (e.g., a new image reconstruction model) or a portion of a model that substitute or supplement a corresponding portion of the model.

In some embodiments, the processing device 140 may be a computer, a user console, a single server or a server group, etc. The server group may be centralized or distributed. In some embodiments, the processing device 140 may be local or remote. For example, the processing device 140 may access information and/or data stored in the imaging device 110, the terminal(s) 130, and/or the storage device 150 via the network 120. As another example, the processing device 140 may be directly connected to the imaging device 110, the terminal(s) 130 and/or the storage device 150 to access stored information and/or data. In some embodiments, the processing device 140 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

The storage device 150 may store data, instructions, and/or any other information. In some embodiments, the storage device 150 may store data obtained from the terminal(s) 130 and/or the processing device 140. For example, the storage device 150 may store image data (e.g., a PET image) acquired by the imaging device 110. As another example, the storage device 150 may store one or more algorithms for processing the image data, an image reconstruction model for image reconstruction, etc. In some embodiments, the storage device 150 may store data and/or instructions that the processing device 140 may execute or use to perform exemplary methods/systems described in the present disclosure. In some embodiments, the storage device 150 may include a mass storage device, a removable storage device, a volatile read-and-write memory, a read-only memory (ROM), or the like, or any combination thereof. Exemplary mass storage devices may include a magnetic disk, an optical disk, a solid-state drive, etc. Exemplary removable storage devices may include a flash drive, a floppy disk, an optical disk, a memory card, a zip disk, a magnetic tape, etc. Exemplary volatile read-and-write memories may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 150 may be connected to the network 120 to communicate with one or more other components in the imaging system 100 (e.g., the processing device 140, the terminal(s) 130, etc.). One or more components in the imaging system 100 may access the data or instructions stored in the storage device 150 via the network 120. In some embodiments, the storage device 150 may be directly connected to or communicate with one or more other components in the imaging system 100 (e.g., the processing device 140, the terminal(s) 130, etc.). In some embodiments, the storage device 150 may be part of the processing device 140 or the imaging device 110.

The terminal(s) 130 may include a mobile device 131, a tablet computer 132, a laptop computer 133, or the like, or any combination thereof. In some embodiments, the mobile device 131 may include a smart home device, a wearable device, a mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, a footgear, eyeglasses, a helmet, a watch, clothing, a backpack, a smart accessory, or the like, or any combination thereof. In some embodiments, the mobile device may include a mobile phone, a personal digital assistant (PDA), a gaming device, a navigation device, a point of sale (POS) device, a laptop, a tablet computer, a desktop, or the like, or any combination thereof. In some embodiments, the virtual reality device and/or the augmented reality device may include a virtual reality helmet, virtual reality glasses, a virtual reality patch, an augmented reality helmet, augmented reality glasses, an augmented reality patch, or the like, or any combination thereof. For example, the virtual reality device and/or the augmented reality device may include a Google Glass™, an Oculus Rift™, a Hololens™, a Gear VR™, etc. In some embodiments, the terminal(s) 130 may be part of the processing device 140 or the imaging device 110.

The network 120 may include any suitable network that can facilitate the exchange of information and/or data for the imaging system 100. In some embodiments, one or more components of the imaging device 110 (e.g., a CT device, a PET device, etc.), the terminal(s) 130, the processing device 140, the storage device 150, etc., may communicate information and/or data with one or more other components of the imaging system 100 via the network 120. For example, the processing device 140 may obtain image data from the imaging device 110 via the network 120. As another example, the processing device 140 may obtain user instructions from the terminal(s) 130 via the network 120.

The network 120 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network ("VPN"), a satellite network, a telephone network, routers, hubs, switches, server computers, and/or any combination thereof. Merely by way of example, the network 120 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 120 may include one or more network access points. For example, the network 120 may include wired and/or wireless network access points such as base stations and/or internet exchange points through which one or more components of the imaging system 100 may be connected to the network 120 to exchange data and/or information.

It should be noted that the above description of the imaging system 100 is merely provided for the purposes of illustration, and not intended to limit the scope of the present disclosure. For persons having ordinary skills in the art, multiple variations and modifications may be made under the teachings of the present disclosure. For example, the imaging system 100 may include one or more additional components and/or one or more components of the imaging system 100 described above may be omitted. Additionally or alternatively, two or more components of the imaging system 100 may be integrated into a single component. A component of the imaging system 100 may be implemented on two or more sub-components.

FIG. 2 is a schematic diagram illustrating hardware and/or software components of an exemplary computing device 200 may be implemented according to some embodiments of the present disclosure. The computing device 200 may be used to implement any component of the imaging system as described herein. For example, the processing device 140 and/or a terminal 130 may be implemented on the computing device 200, respectively, via its hardware, software program, firmware, or a combination thereof. Although only one such computing device is shown, for convenience, the computer functions relating to the imaging system 100 as described herein may be implemented in a distributed fashion on a number of similar platforms, to distribute the processing load. As illustrated in FIG. 2, the computing device 200 may include a processor 210, a storage 220, an input/output (I/O) 230, and a communication port 240.

The processor 210 may execute computer instructions (program codes) and perform functions of the processing device 140 in accordance with techniques described herein. The computer instructions may include, for example, routines, programs, objects, components, signals, data structures, procedures, modules, and functions, which perform particular functions described herein. For example, the processor 210 may reconstruct a target image of a subject based on an initial image of the subject, wherein the target image may have a higher image quality than the initial image (e.g., a lower noise level and/or a higher image resolution). As another example, the processor 210 may generate an image reconstruction model according to a machine learning technique. In some embodiments, the processor 210 may perform instructions obtained from the terminal(s) 130. In some embodiments, the processor 210 may include one or more hardware processors, such as a microcontroller, a microprocessor, a reduced instruction set computer (RISC), an application-specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field-programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operations A and B).

The storage 220 may store data/information obtained from the imaging device 110, the terminal(s) 130, the storage device 150, or any other component of the imaging system 100. In some embodiments, the storage 220 may include a mass storage device, a removable storage device, a volatile read-and-write memory, a read-only memory (ROM), or the like, or any combination thereof. In some embodiments, the storage 220 may store one or more programs and/or instructions to perform exemplary methods described in the present disclosure. For example, the storage 220 may store a program for the processing device 140 to reconstruct a target image of a subject.

The I/O 230 may input or output signals, data, and/or information. In some embodiments, the I/O 230 may enable user interaction with the processing device 140. In some embodiments, the I/O 230 may include an input device and an output device. Exemplary input devices may include a keyboard, a mouse, a touch screen, a microphone, or the like, or a combination thereof. Exemplary output devices may include a display device, a loudspeaker, a printer, a projector, or the like, or a combination thereof. Exemplary display devices may include a liquid crystal display (LCD), a light-emitting diode (LED)-based display, a flat panel display, a curved screen, a television device, a cathode ray tube (CRT), or the like, or a combination thereof.

The communication port 240 may be connected with a network (e.g., the network 120) to facilitate data communications. The communication port 240 may establish connections between the processing device 140 and the imaging device 110, the terminal(s) 130, or the storage device 150. The connection may be a wired connection, a wireless connection, or a combination of both that enables data transmission and reception. The wired connection may include an electrical cable, an optical cable, a telephone wire, or the like, or any combination thereof. The wireless connection may include a Bluetooth network, a Wi-Fi network, a WiMax network, a WLAN, a ZigBee network, a mobile network (e.g., 3G, 4G, 5G, etc.), or the like, or any combination thereof. In some embodiments, the communication port 240 may be a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
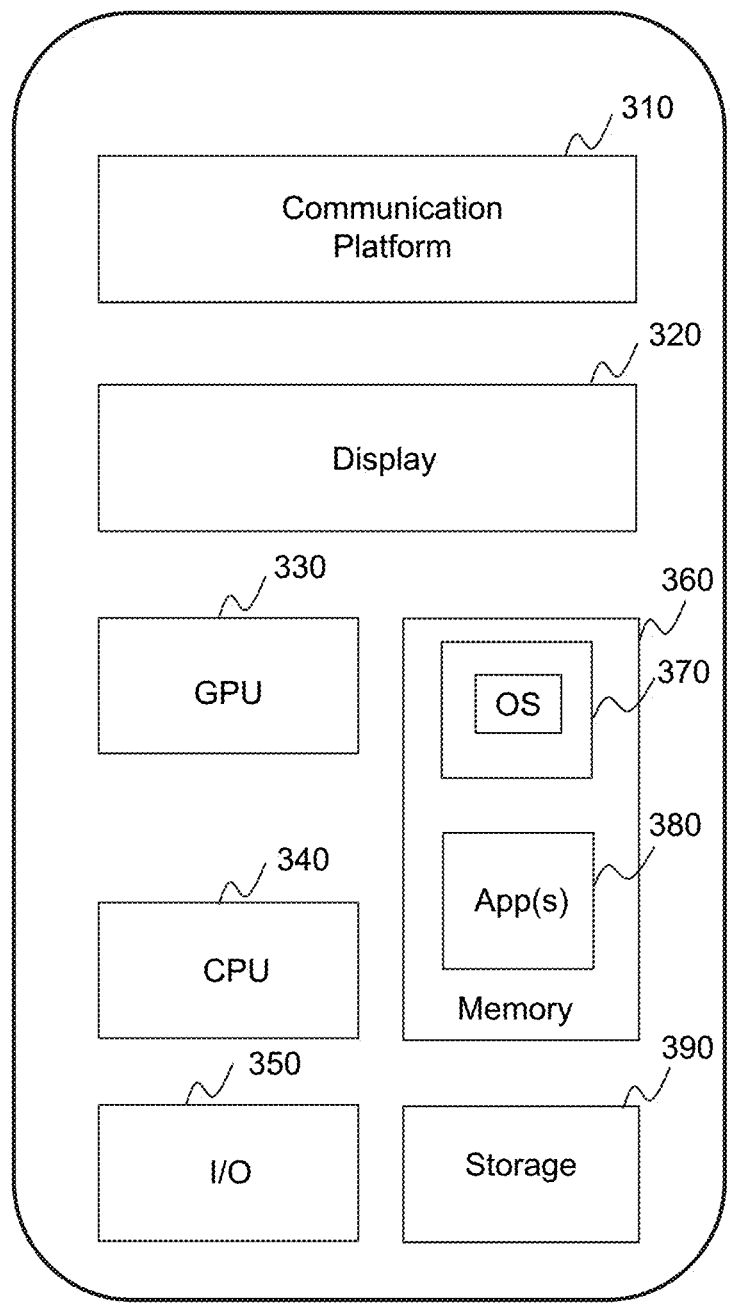
FIG. 3 is a schematic diagram illustrating hardware and/or software components of an exemplary mobile device according to some embodiments of the present disclosure.

FIG. 3 is a schematic diagram illustrating hardware and/or software components of an exemplary mobile device 300 according to some embodiments of the present disclosure. In some embodiments, one or more components (e.g., a terminal 130 and/or the processing device 140) of the imaging system 100 may be implemented on the mobile device 300.

As illustrated in FIG. 3, the mobile device 300 may include a communication platform 310, a display 320, a graphics processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS, Android, Windows Phone, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing device 140. User interactions with the information stream may be achieved via the I/O 350 and provided to the processing device 140 and/or other components of the imaging system 100 via the network 120.

To implement various modules, units, and their functionalities described in the present disclosure, computer hardware platforms may be used as the hardware platform(s) for one or more of the elements described herein. The hardware elements, operating systems and programming languages of such computers are conventional in nature, and it is presumed that those skilled in the art are adequately familiar therewith to adapt those technologies to generate an image as described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result, the drawings should be self-explanatory.

Figure 4A:
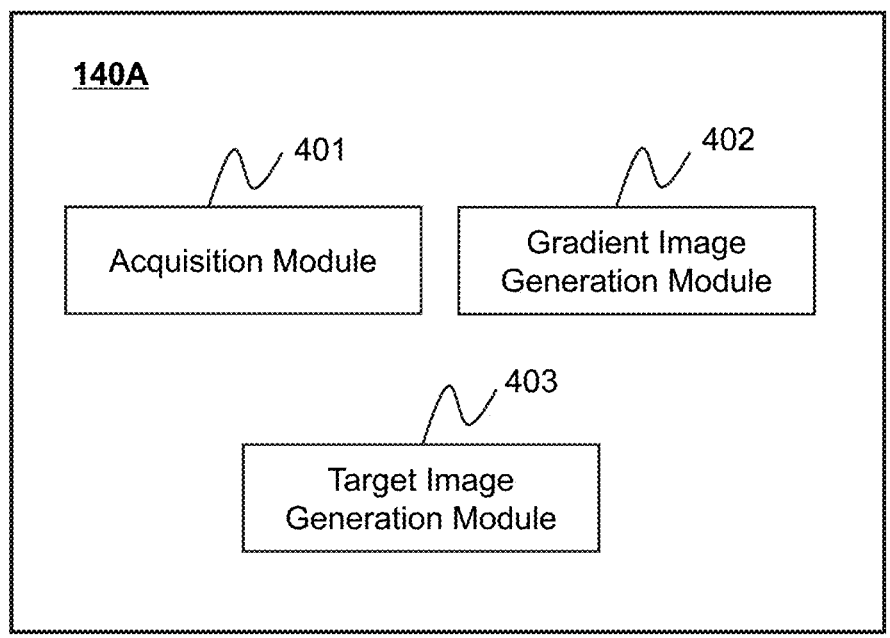
FIGS. 4A and 4B are block diagrams illustrating exemplary processing devices according to some embodiments of the present disclosure.
Figure 4B:
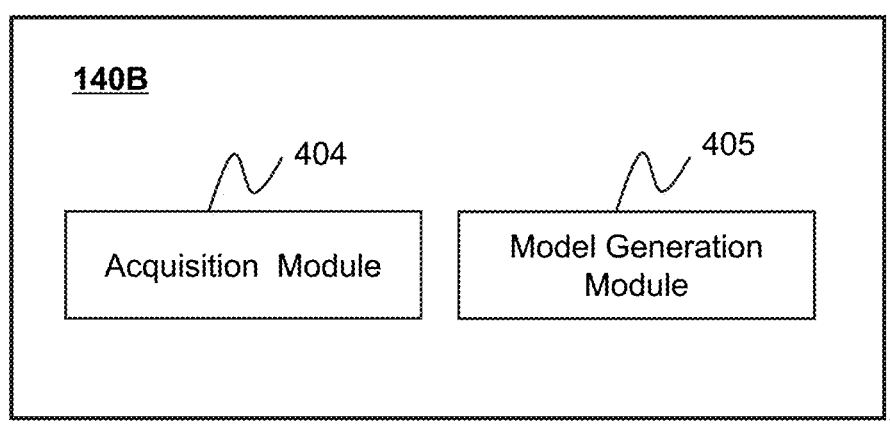

FIG. 4A and FIG. 4B are block diagrams illustrating exemplary processing devices 140A and 140B according to some embodiments of the present disclosure. In some embodiments, the processing devices 140A and 140B may be embodiments of the processing device 140 as described in connection with FIG. 1. In some embodiments, the processing devices 140A and 140B may be respectively implemented on a processing unit (e.g., the processor 210 illustrated in FIG. 2 or the CPU 340 as illustrated in FIG. 3). Merely by way of example, the processing devices 140A may be implemented on a CPU 340 of a terminal device, and the processing device 140B may be implemented on a computing device 200. As another example, the processing device 140A may be implemented on a computing device of the imaging system 100, while the processing device 140B may be part of a device or system of the manufacturer of the imaging system 100, or a portion thereof (e.g., the imaging device 110), or a vendor that maintains the imaging system 100, or a portion thereof (e.g., the imaging device 110). Alternatively, the processing devices 140A and 140B may be implemented on a same computing device 200 or a same CPU 340. For example, the processing devices 140A and 140B may be implemented on a same computing device 200.

As shown in FIG. 4A, the processing device 140A may include an acquisition module 401, a gradient image generation module 402, and a target image generation module 403.

The acquisition module 401 may be configured to obtain an initial image of a subject (e.g., a patient). An initial image of the subject refers to an image that is generated based on scan data of the subject, wherein the scan data may be collected by an imaging device during a scan of the subject. In some embodiments, the initial image may correspond to a first radiation dose. The acquisition module 401 may obtain the initial image from the imaging device or a storage device (e.g., the storage device 150, the storage 220, an external source) that stores the initial image. More descriptions regarding the initial image may be found elsewhere in the present disclosure. See, e.g., operation 510 and relevant descriptions thereof.

The gradient image generation module 402 may be configured to generate a gradient image associated with the initial image. A gradient image associated with the initial image is used herein to collectively refer to any image that includes detail information (e.g., edge information, texture information, color information) of the initial image. In some embodiments, the gradient image generation module 402 may generate the gradient image by processing the initial image using a gradient operator (e.g., a Sobel operator) or a guided-filtering algorithm. More descriptions regarding the generation of the gradient image may be found elsewhere in the present disclosure. See, e.g., operation 520 and relevant descriptions thereof.

The target image generation module 403 may be configured to generate a target image of the subject by applying an image reconstruction model based on the initial image and the gradient image. A target image of the subject refers to an image that is reconstructed based on the initial image by applying an image reconstruction model, wherein the target image may have a higher image quality than the initial image. An image reconstruction model refers to a model configured to output an image that has a desired image quality based on its input. The image reconstruction model may be of any type of neural network model, such as a trained cascaded neural network. In some embodiments, the target image may correspond to a second radiation dose higher than the first radiation dose. More descriptions regarding the generation of the target image may be found elsewhere in the present disclosure. See, e.g., operation 530 and relevant descriptions thereof.

As shown in FIG. 4B, the processing device 140B may include an acquisition module 404 and a model generation module 405.

The acquisition module 404 may be configured to obtain a plurality of training samples and a preliminary model. Each of the raining samples may include a sample initial image of a sample subject, a sample gradient image associated with the sample initial image, and a sample target image of the sample subject. The sample target image of each training sample may have a higher image quality than the sample initial image of the training sample. More descriptions regarding the training samples may be found elsewhere in the present disclosure. See, e.g., operation 1110 and relevant descriptions thereof. The preliminary model may be of any type of neural network model, for example, a neural network model (e.g., a CNN model, a GAN model, a cascaded neural network, or the like). More descriptions regarding the preliminary model may be found elsewhere in the present disclosure. See, e.g., operation 1120 and relevant descriptions thereof.

The model generation module 405 may be configured to generate the image reconstruction model by training the preliminary model using the plurality of training samples. In some embodiments, the model generation module 405 may train the preliminary model according to a machine learning algorithm as described elsewhere in this disclosure (e.g., FIG. 5 and the relevant descriptions). Merely by way of example, the model generation module 405 may generate the image reconstruction model according to a supervised machine learning algorithm by performing one or more iterations to iteratively update the model parameter(s) of the preliminary model. More descriptions regarding the generation of the image reconstruction model may be found elsewhere in the present disclosure. See, e.g., operation 1130 and relevant descriptions thereof.

It should be noted that the above description is merely provided for the purposes of illustration, and not intended to limit the scope of the present disclosure. Apparently, for persons having ordinary skills in the art, multiple variations and modifications may be conducted under the teachings of the present disclosure. However, those variations and modifications do not depart from the scope of the present disclosure. Each of the modules described above may be a hardware circuit that is designed to perform certain actions, e.g., according to a set of instructions stored in one or more storage media, and/or any combination of the hardware circuit and the one or more storage media.

In some embodiments, the processing device 140A and/or the processing device 140B may share two or more of the modules, and any one of the modules may be divided into two or more units. For instance, the processing devices 140A and 140B may share a same acquisition module, that is, the acquisition module 401 and the acquisition module 404 are a same module. In some embodiments, the processing device 140A and/or the processing device 140B may include one or more additional modules, such as a storage module (not shown) for storing data. In some embodiments, the processing device 140A and the processing device 140B may be integrated into one processing device 140.

FIG. 5 is a flowchart illustrating an exemplary process 500 for generating a target image of a subject based on an initial image of the subject according to some embodiments of the present disclosure. As used herein, a subject may be biological or non-biological. For example, the subject may include a patient (or a portion thereof), a man-made object, etc., as described elsewhere in the present disclosure (e.g., FIG. 1 and the descriptions thereof). An initial image of the subject refers to an image that is generated based on scan data of the subject, wherein the scan data may be collected by an imaging device during a scan of the subject. A target image of the subject refers to an image that is reconstructed based on the initial image by applying an image reconstruction model, wherein the target image may have a higher image quality than the initial image.

The image quality of an image may be measured by one or more image quality indexes, such as an image resolution, a noise level, a contrast ratio, a sharpness value, or the like, or any combination thereof. The image quality of two images may be compared by comparing the one or more image quality indexes. For example, the target image may be regarded as having a higher image quality than the initial image if the image resolution of the target image may be higher than that of the initial image. Additionally or alternatively, the target image may be regarded as having a higher image quality than the initial image if the target image may have a lower noise level (e.g., fewer artifacts) than the initial image.

In some embodiments, the initial image may correspond to a first radiation dose. The first radiation dose refers to the dose of radiation applied to or received by the subject in collecting the scan data corresponding to the initial image. For example, the initial image may be a PET image generated based on PET data relating to the subject. The first radiation dose may be measured by the amount of radioactive tracer (e.g., fludeoxy glucose, prostate specific membrane antigen, etc.) injected into the subject before the collection of the PET data. As another example, the initial image may be a CT image generated based on CT data relating to the subject. The first radiation dose may be measured by the amount of X-rays emitted by an X-ray source in collecting the CT data.

The target image may correspond to a second radiation dose higher than the first radiation dose. As aforementioned, the target image may be reconstructed based on the initial image and the image reconstruction model without performing an actual scan on the subject. The second radiation dose refers to a predicted or simulated dose of radiation that needs to be applied to or received by the subject to collect scan data for generating an image of a same (or substantially same) quality as the target image. In other words, to generate a certain image that is of the same (or substantially same) quality as the target image by performing an actual scan on the subject, the radiation dose applied to or received by the subject in the actual scan may be substantially equal to the second radiation dose. Normally, the radiation dose applied to or received by the subject in a scan may have an effect on a resulting image of the scan. For example, if other imaging conditions remain unchanged, increasing the radiation dose may result in an image having a higher image quality (e.g., a lower noise level and/or a higher image resolution). However, increasing the radiation dose may cause more radiation and/or damage to the subject. The systems and methods disclosed herein may be used to generate the target image with an improved image quality without increasing the radiation and damage to the subject. In addition, in some embodiments, the systems and methods disclosed herein may improve the scan efficiency by reducing the scan time and/or reducing a probability of patient movement in scan.

In some embodiments, each of the first radiation dose and the second radiation dose may be represented in the form of a number or a number range. The first radiation dose and/or the second radiation dose may be set according to a defaulting setting of the imaging system 100. Alternatively, the first radiation dose and/or the second radiation dose may be set manually by a user or a computing device (e.g., the processing device 140A) according to an actual need. In some embodiments, the second radiation dose may be a standard dose commonly used in generating images of the same type as the target image (e.g., a standard dose in PET imaging).

It should be noted that the above description regarding the initial image and the target image is merely provided for the purposes of illustration, and not intended to limit the scope of the present disclosure. The difference of radiation dose may be an exemplary factor that induces the difference of image quality between the initial image and the target image. One or more other factors, such as, a scan time, a hardware performance of the imaging device, a patient movement, may also affect the image quality of the initial image. The systems and methods may be applied to reduce or eliminate the effect of one or more other factors to improve the image quality. Merely by way of example, the initial image may include respiratory artifacts caused by a respiratory motion of the subject in collecting the scan data corresponding to the initial image. By performing the process 500, a target image with less respiratory artifacts may be generated based on the initial image.

In some embodiments, process 500 may be implemented as a set of instructions (e.g., an application) stored in a storage device (e.g., the storage device 150, the storage 220, and/or the storage 390). The processing device 140A (e.g., the processor 210, the CPU 340, and/or one or more modules illustrated in FIG. 4A) may execute the set of instructions, and when executing the instructions, the processing device 140A may be configured to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 140A (e.g., the acquisition module 401) may obtain the initial image of the subject.

As described above, the initial image may be generated based on the scan data of the subject collected by the imaging device. The initial image may be a 2D image (e.g., a slice image), a 3D image, a 4D image (e.g., a series of 3D images over time), or any other type of image. For example, the initial image may be a 3D PET image generated based on scan data collected by, such as, a PET device, a PET/CT device, or a PET/MRI device. In some embodiments, the initial image may be obtained from the imaging device or a storage device that stores the initial image (e.g., the storage device 150, the storage 220, the storage 390, or an external source). For example, the initial image may be obtained from a medical image database, such as a Picture Archiving and Communication System (PACS), via a network (e.g., the network 120).

In some alternative embodiments, the processing device 140A may acquire the scan data from the imaging device or a storage device (e.g., the storage device 150, the storage 220, an external source) that stores the scan data. The processing device 140A may further reconstruct the initial image based on the scan data according to an image reconstruction algorithm. For example, the processing device 140A may obtain scan data of the subject from a PET device or a PET/CT device, and reconstruct a PET image the initial image based on the scan data according to a PET image reconstruction algorithm. Exemplary PET image reconstruction algorithms may include an ordered subset expectation maximization (OSEM) algorithm, a filtered back projection (FBP) algorithm, a maximum-likelihood reconstruction of attenuation and activity (MLAA) algorithm, or the like, or any combination thereof.

Optionally, the processing device 140A may preprocess the initial image. The preprocessing of the initial image may include one or more image processing operations, such as an image denoising, an image enhancement, an image smoothing, an image transformation, an image resampling, an image normalization, or the like, or a combination thereof. In some embodiments, the preprocessing of the initial image may include an image resampling and an image normalization, which may be performed simultaneously or in any sequence.

Merely by way of example, the image reconstruction model may correspond to a target image resolution, for example, be trained by training images having the target image resolution. The processing device 140A may determine whether the image resolution of the initial image is the same (or substantially same) as the target image resolution. If the initial image has an imaging resolution different from the target image resolution, the processing device 140A may resample the initial image to generate a resampled initial image having the target image resolution. Merely by way of example, the target image resolution may be 100 pixels per inch (PPI), and the image resolution of the initial image may be 80 PPI or 120 PPI. The processing device 140A may generate a resampled initial image with an image resolution of 100 PPI according to an image resampling algorithm. Exemplary image resampling algorithms may include a nearest neighbor algorithm, a bilinear interpolation algorithm, a cubic convolution algorithm, a bilinear and bicubic algorithm, a Sinc and Lanczos resampling algorithm, a box sampling algorithm, a mipmap algorithm, a Fourier-transform algorithm, an edge-directed interpolation algorithm, a vectorization algorithm, a deep convolution neural network, or the like, or any combination thereof.

The processing device 140A may further generate a preprocessed initial image by normalizing the resampled initial image. In some embodiments, the resampled initial image may be normalized such that the preprocessed initial image may have a preset format. For example, pixel (or voxel) values of the preprocessed initial image may be within a preset range (e.g., [−1, 1]). In some embodiments, the resampled initial image may be normalized according to Equation (1) as below:

$$I' = \frac{I - I_{min}}{I_{max} - I_{min}}, \quad (1)$$

where I may represent the resampled initial image or, I' may represent the preprocessed initial image, $I_{max}$ may represent the maximum pixel value (or voxel value) of the resampled initial image, and $I_{min}$ may represent the minimum pixel value (or voxel value) of the resampled initial image.

If the imaging resolution of the initial image is equal to the target image resolution, the resampling of the initial image may be omitted, and the processing device 140A may generate the preprocessed initial image by normalizing the initial image. It should be noted that the above description of preprocessing of the initial image is merely provided for the purposes of illustration, and not intended to limit the scope of the present disclosure. For example, the processing device 140A may normalize the initial image, and then resample the normalized initial image to generate the preprocessed initial image. In some embodiments, the preprocessed initial image may be previously generated by the processing device 140A (or another computing device) and stored in a storage device. The processing device 140A may directly obtain the preprocessed initial image from the storage device, and designate the preprocessed initial image as the initial image.

In 520, the processing device 140A (e.g., the gradient image generation module 402) may generate a gradient image associated with the initial image.

A gradient image associated with the initial image is used herein to collectively refer to any image that includes detail information (e.g., edge information, texture information, color information) of the initial image. For example, the gradient image may indicate a variation of pixel value (or voxel value) in the initial image. In some embodiments, the gradient image may be a 2D image or a 3D image. Using the gradient image in reconstructing the target image may facilitate the recovery of image details of the initial image, thereby generating a target image with improved image quality.

In some embodiments, the processing device 140A may generate the gradient image by processing the initial image using a gradient operator. Exemplary gradient operators may include a Sobel operator, a Prewit operator, a Robert cross operator, a Laplacian operator, a Scharr operator, or the like, or any combination thereof. As another example, the processing device 140A may generate an image that includes detail information of the initial image by processing the initial image according to a guided-filtering algorithm. Merely by way of example, the processing device 140A may filter the initial image, and divide the initial image by the filtered initial image to generate the gradient image. For the convenience of descriptions, an image that includes detail information of the initial image generated by the guided-filtering algorithm or another algorithm is referred to as a gradient image herein.

In some embodiments, the initial image may need to be preprocessed as described in connection with operation 510. The processing device 140A may generate the gradient image by processing the preprocessed initial image using, for example, a gradient operator or a guided-filtering algorithm.

Optionally, the processing device 140A may generate a preprocessed gradient image by normalizing the gradient image. For example, the gradient image may be normalized according to Equation (2) as below:

$$G' = \frac{G - G_{min}}{G_{max} - G_{min}}, \quad (2)$$

where G may represent the gradient image, G' may represent the preprocessed gradient image, $G_{max}$ may represent the maximum pixel value (or voxel value) of the gradient image, and $G_{min}$ may represent the minimum pixel value (or voxel value) of the gradient image.

In 530, the processing device 140A (e.g., the target image generation module 403) may generate the target image of the subject by applying an image reconstruction model based on the initial image and the gradient image.

As used herein, an image reconstruction model refers to a model configured to output an image that has a desired image quality based on its input. For example, the input of the image reconstruction model may be the initial image and the gradient image. As another example, the initial image and the gradient image may be preprocessed as described in connection with operations 510 and 520. The input of the image reconstruction model may be the preprocessed initial image and the preprocessed gradient image. In some embodiments, an input of the image reconstruction model may include a plurality of images. The images may be directly inputted into the image reconstruction model, or be concatenated into one or more concatenated images and inputted into the model. For the convenience of descriptions, the following descriptions are described with reference to generating the target image based on an input including the initial image and the gradient image, and not intended to limit the scope of the present disclosure.

In some embodiments, the processing device 140A may extract one or more first 2D images from the initial image and one or more second 2D images from the gradient image. The processing device 140A may further generate the target image based on the first 2D image(s) and the second 2D image(s) by applying the image reconstruction model. Optionally, the first 2D image(s) may include multi-view information (e.g., information in an axial view, a sagittal view, and/or a coronary view) of the initial image, and the second 2D image(s) may include multi-view information of the gradient image. Using the multi-view information of the initial image and the gradient image may improve the accuracy of the reconstruction result. More descriptions regarding the first and second 2D images may be found elsewhere in the present disclosure. See, e.g., FIG. 6 and relevant descriptions thereof.

The image reconstruction model may be of any type of neural network model. For example, the image reconstruction model may include a neural network model, such as a convolutional neural network (CNN) model (e.g., a full CNN model, V-net model, a U-net model, an AlexNet model, an Oxford Visual Geometry Group (VGG) model, a ResNet model), a generative adversarial network (GAN) model, or the like, or any combination thereof. Optionally, the image reconstruction model may include one or more components for feature extraction and/or feature combination, such as a fully convolutional block, a skip-connection, a residual block, a dense block, or the like, or any combination thereof.

Figure 8:
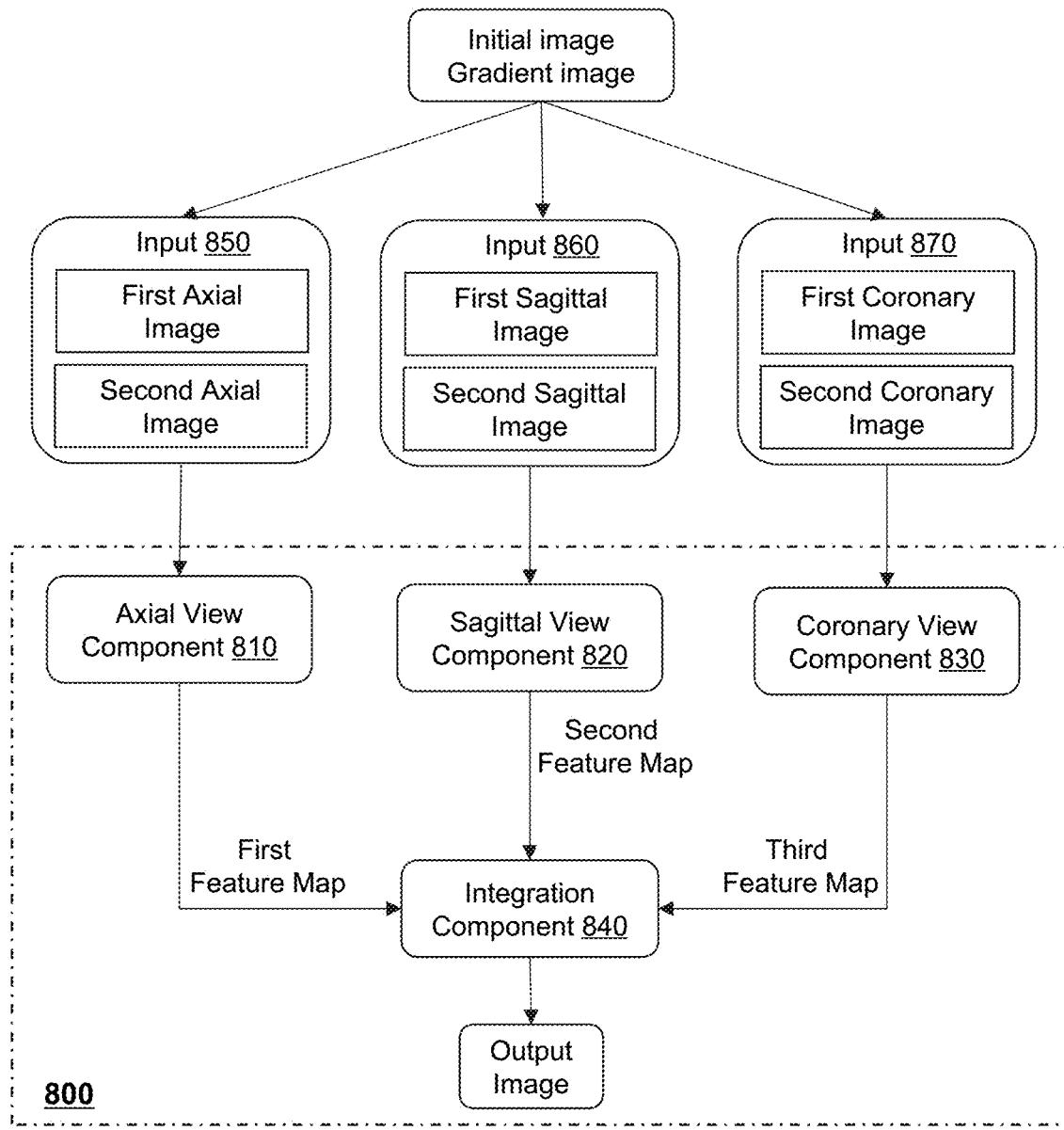
FIG. 8 is a schematic diagram illustrating an exemplary model according to some embodiments of the present disclosure.

In some embodiments, the image reconstruction model may include multiple components (e.g., an axial view component 810, a sagittal view component 820, a coronary view component 830, and an integration component 840 as shown in FIG. 8) configured to process multi-view information of the initial image and the gradient image. More descriptions regarding the multiple components may be found elsewhere in the present disclosure. See, e.g., FIGS. 6 and 8 and relevant descriptions thereof.

In some embodiments, the image reconstruction model may be a trained cascaded neural network including a plurality of trained models that are sequentially connected. The plurality of trained models may include a trained first model and at least one trained second model downstream to the trained first model. The trained first model may be configured to process an input of the trained cascaded neural network, and each trained second model may be configured to process an output of a previously trained model connected to the trained second model. Optionally, the trained cascaded neural network may adopt a deep auto-context learning strategy, according to which the input of the trained cascaded neural network may be also inputted into each trained second model. This may avoid a loss of image data due to operations (e.g., a convolutional operation) performed during the application of the trained cascaded neural network. More descriptions regarding the trained cascaded neural network may be found elsewhere in the present disclosure. See, e.g., FIGS. 7 and 9 and relevant descriptions thereof.

In some embodiments, the processing device 140A (e.g., the acquisition module 401) may obtain the image reconstruction model from one or more components of the imaging system 100 (e.g., the storage device 150, the terminals(s) 130) or an external source via a network (e.g., the network 120). For example, the image reconstruction model may be previously trained by a computing device (e.g., the processing device 140B), and stored in a storage device (e.g., the storage device 150, the storage 220, and/or the storage 390) of the imaging system 100. The processing device 140A may access the storage device and retrieve the image reconstruction model. In some embodiments, the image reconstruction model may be generated according to a machine learning algorithm. The machine learning algorithm may include but not be limited to an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the image reconstruction model may be a supervised learning algorithm, a semi-supervised learning algorithm, an unsupervised learning algorithm, or the like. In some embodiments, the image reconstruction model may be generated by a computing device (e.g., the processing device 140B) by performing a process (e.g., process 1000) for generating an image reconstruction model disclosed herein. More descriptions regarding the generation of the image reconstruction model may be found elsewhere in the present disclosure. See, e.g., FIGS. 10-12 and relevant descriptions thereof.

In some embodiments, the image reconstruction model may directly output the target image of the subject according to its input. Alternatively, the image reconstruction model may output an initial target image, and the processing device 140A may need to post-process the initial target image of the subject to generate the target image. Merely by way of example, if the image resolution of the initial image is equal to the target image resolution, the preprocessing of the initial image may be performed without resampling the initial image. The initial image may be normalized before the application of the image reconstruction model according to its maximum pixel value (or voxel value) (denoted as $I'_{max}$) and its minimum pixel value (or voxel value) (denoted as $I'_{min}$). The processing device 140A may generate the target image by performing a denormalization operation on the initial target image. For example, the initial target image may be denormalized according to Equation (3) as below:

$$T' = T*(I'_{max} - I'_{min}) + I'_{min}, \qquad (3)$$

where T may represent the initial target image, and T' may represent the target image. In some embodiments, if the image resolution of the initial image is not equal to the target image resolution, the preprocessing of the initial image may include image normalization and image resampling. The processing device 140A may further resample the denormalized target image to generate a final target image that has the same image resolution as the original initial image.

It should be noted that the above description regarding the process 500 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations of the process 500 may be omitted and/or one or more additional operations may be added.

For example, a storing operation may be added elsewhere in the process 500. In the storing operation, the processing device 140A may store information and/or data (e.g., the target image, the image reconstruction model, etc.) associated with the imaging system 100 in a storage device (e.g., the storage device 150) disclosed elsewhere in the present disclosure. As another example, a first additional operation may be performed between operations 510 and 520 to preprocess the initial image, and a second additional operation may be performed between operations 520 and 530 to preprocess the gradient image. In 530, the target image may be generated based on the preprocessed initial image and the preprocessed gradient image by applying the image reconstruction model. As yet another example, after 530, the processing device 140A may transmit the target image of the subject to a terminal (e.g., a terminal 130) for display.

In some embodiments, the process 500 may be used in testing the image reconstruction model. Merely by way of example, after the image reconstruction model is generated, a computing device (e.g., the processing device 140A or 140B) may test the image reconstruction model using a set of testing samples. Each testing sample may include a testing initial image of a testing subject and a known target image of the testing subject. For example, the testing initial image of a testing subject may be generated based on scan data of the testing subject corresponding to the first radiation dose. The known target image of a testing subject may be generated based on scan data of the testing subject corresponding to the second radiation dose. For each testing sample, the computing device may perform process 500 on the testing initial image of the testing sample to generate a corresponding target image. The computing device may further compare the target image and the known target image of each testing sample. The comparison result (e.g., a difference between the target image and the known target image of each testing sample) may indicate an accuracy and/or a reliability of the image reconstruction model. The computing device may evaluate the image reconstruction model based on the comparison result.

Figure 6:
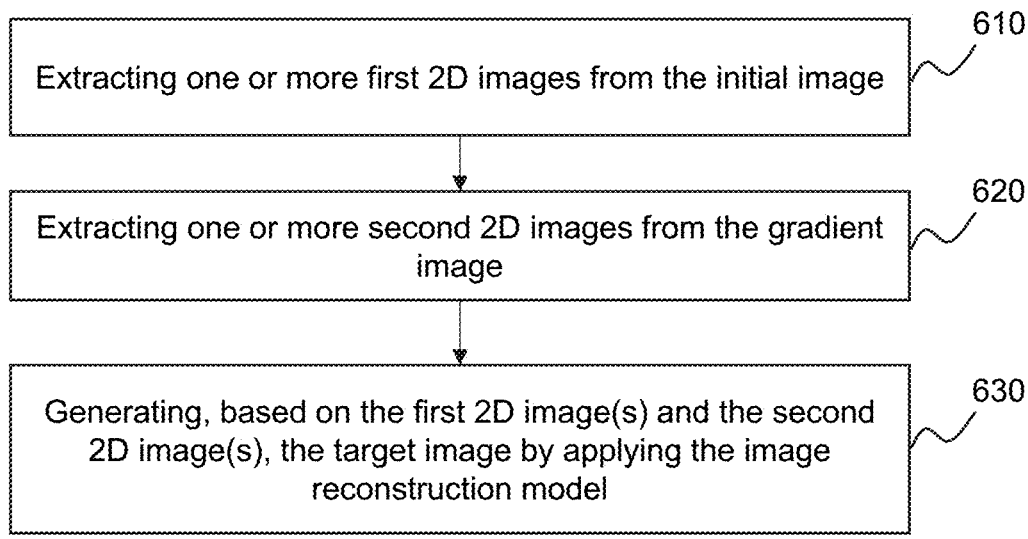
FIG. 6 is a flowchart illustrating an exemplary process for generating a target image of a subject by applying an image reconstruction model according to some embodiments of the present disclosure.

FIG. 6 is a flowchart illustrating an exemplary process for generating a target image of a subject by applying an image reconstruction model according to some embodiments of the present disclosure. In some embodiments, process 600 may be implemented as a set of instructions (e.g., an application) stored in a storage device (e.g., the storage device 150, storage 220, and/or storage 390). The processing device 140A (e.g., the processor 210, the CPU 340, and/or one or more modules illustrated in FIG. 4A) may execute the set of instructions, and when executing the instructions, the processing device 140A may be configured to perform the process 600. The operations of the illustrated process presented below are intended to be illustrative. In some embodiments, one or more operations of the process 600 may be performed to achieve at least part of operation 530 as described in connection with FIG. 5.

In 610, the processing device 140A (e.g., the target image generation module 403) may extract one or more first 2D images from the initial image.

In some embodiments, the initial image may be a 3D image, and a first 2D image may be extracted from the 3D initial image along any direction. For example, the first 2D image(s) may include one or more first axial images, one or more first sagittal images, and one or more first coronal images. As used herein, an axial image of a subject refers to an image corresponding to an axial view of the subject; a sagittal image refers to an image corresponding to a sagittal view of the subject; and a coronal image refers to an image corresponding to a coronal view of the subject. The count of the first 2D image(s) may be equal to any positive integer, such as, 1, 3, 5, 10, 15, or the like.

In 620, the processing device 140A (e.g., the target image generation module 403) may extract one or more second 2D images from the gradient image.

In some embodiments, the gradient image may be a 3D image, and a second 2D image may be extracted from the 3D gradient image along any direction. For example, the second 2D image(s) may include one or more second axial images, one or more second sagittal images, and one or more second coronal images. The count of the second 2D image(s) may be equal to any positive integer, such as, 1, 3, 5, 10, 15, or the like.

In some embodiments, the count of the second 2D image(s) may be equal to that of the first 2D image(s). Each of the second 2D image(s) may correspond to one of the first 2D image(s). As used herein, a second 2D image and a first 2D image may be regarded as corresponding to each other if they correspond to a same view (e.g., an axial view, a sagittal view, a coronal view) of a same portion (e.g., a same cross-section) of the subject.

In 630, based on the first 2D image(s) and the second 2D image(s), the processing device 140A (e.g., the target image generation module 403) may generate the target image of the subject by applying the image reconstruction model.

For example, the processing device 140A may input the first 2D image(s) and the second 2D image(s) into the image reconstruction model. The image reconstruction model may output the target image. Alternatively, the image reconstruction model may output an initial target image, and the processing device 140A may post-process the initial target image to generate the target image. Optionally, the processing device 140A may concatenate the first 2D image(s) and the second 2D image(s) into one or more concatenated images, and input the one or more concatenated images into the image reconstruction model. The image reconstruction model may output the target image or the initial target image in response to the one or more concatenated images.

Merely by way of example, the first 2D image(s) may include the first axial image(s), the first sagittal image(s), and the first coronary image(s) extracted from the initial image. The second 2D image(s) may include the second axial image(s), the second sagittal image(s), and the second coronary image(s) extracted from the gradient image. The processing device 140A may generate a first concatenated image by concatenating the first axial image(s) and the second axial image(s); a second concatenated image by concatenating by the first sagittal image(s) and the second sagittal image(s); and a third concatenated image by concatenating by the first coronary image(s) and the second coronary image(s).

For illustration purposes, the generation of the first concatenated image is described as an example. The first axial image(s) and the second axial image(s) may be concatenated along a preset dimension (e.g., a channel dimension). For example, each of the first axial image(s) and the second axial image(s) may both be a 2-dimensional image including a first dimension and a second dimension. The first axial image(s) and the second axial image(s) may be concatenated along a third dimension to generate the first concatenated image (e.g., a 3-dimensional image including the first, second, and third dimensions). Merely by way of example, 5 first axial images and 5 second axial images, each of which has an image resolution of 64*64, may be concatenated to generate a first 3D concatenated image having an image resolution of 64*64*10. In some embodiments, the concentration of a plurality of 2D images along a channel dimension may also be referred to as a 2.5D concatenation.

The first, second, and third concatenated images may then be inputted into the image reconstruction model for processing. In some embodiments, the image reconstruction model may have a same or similar configuration as a trained model 800 as shown in FIG. 8. As illustrated in FIG. 8, the trained model 800 may include an axial view component 810, a sagittal view component 820, a coronary view component 830, and an integration component 840. The first, second, and third concatenated images may serve as an input 850, an input 860, and an input 870, respectively, of the trained model 800. The axial view component 810 may be configured to receive the first concatenated image (i.e., the input 850), and generate a first feature map by processing the first concatenated image. The sagittal view component 820 may be configured to receive the second concatenated image (i.e., the input 860), and generate a second feature map by processing the second concatenated image. The coronary view component 830 may be configured to receive the third concatenated image (i.e., the input 870), and generate a third feature map by processing the third concatenated image. The integration component 840 may be configured to generate an output image (e.g., the target image or the initial target image) based on the first feature map, the second feature map, and the third feature map. Optionally, the first, second, and third feature maps may be concatenated into a fourth concatenated image before being inputted into the integration component 840.

The types of the axial view component 810, the sagittal view component 820, the coronary view component 830, and the integration component 840 may be the same as or different from each other. For example, the multiple components of the trained model 800 may all be convolutional networks. Optionally, a component of the trained model 800 may include at least one of a fully convolutional block, a skip-connection, a residual block, or a dense block. The first 2D image(s) and the second 2D image(s) may include multi-view information of the initial image and the gradient image, respectively. The multiple components of the trained model 800 may extract features of the initial image and the gradient image from different views, which may improve the accuracy of the reconstruction result.

In some embodiments, the image reconstruction model may be a trained cascaded neural network that includes a plurality of sequentially connected models. The processing device 140A may input the first 2D image(s) and the second 2D image(s) (e.g., in the form of first, second, and third concatenated images) into the trained cascaded neural network to generate an output (e.g., the target image or the initial target image). For example, the processing device 140A may perform one or more operations of process 700 as described in connection with FIG. 7 to generate the target image by applying the trained cascaded neural network.

It should be noted that the above description regarding the process 600 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. The operations of the illustrated process presented below are intended to be illustrative. In some embodiments, the process 600 may be accomplished with one or more additional operations not described and/or without one or more of the operations discussed. For example, operations 610 and 620 may be omitted. In 630, the processing device 140A may generate a concatenated image by concatenating the initial image (or preprocessed initial image) and the gradient image (or preprocessed initial image), and generate the target image based on the concatenated image. Additionally, the order of the operations of process 600 illustrated in FIG. 6 and described below is not intended to be limiting. For example, operations 610 and 620 may be performed simultaneously, or operation 620 may be performed before operation 610.

Figure 7:
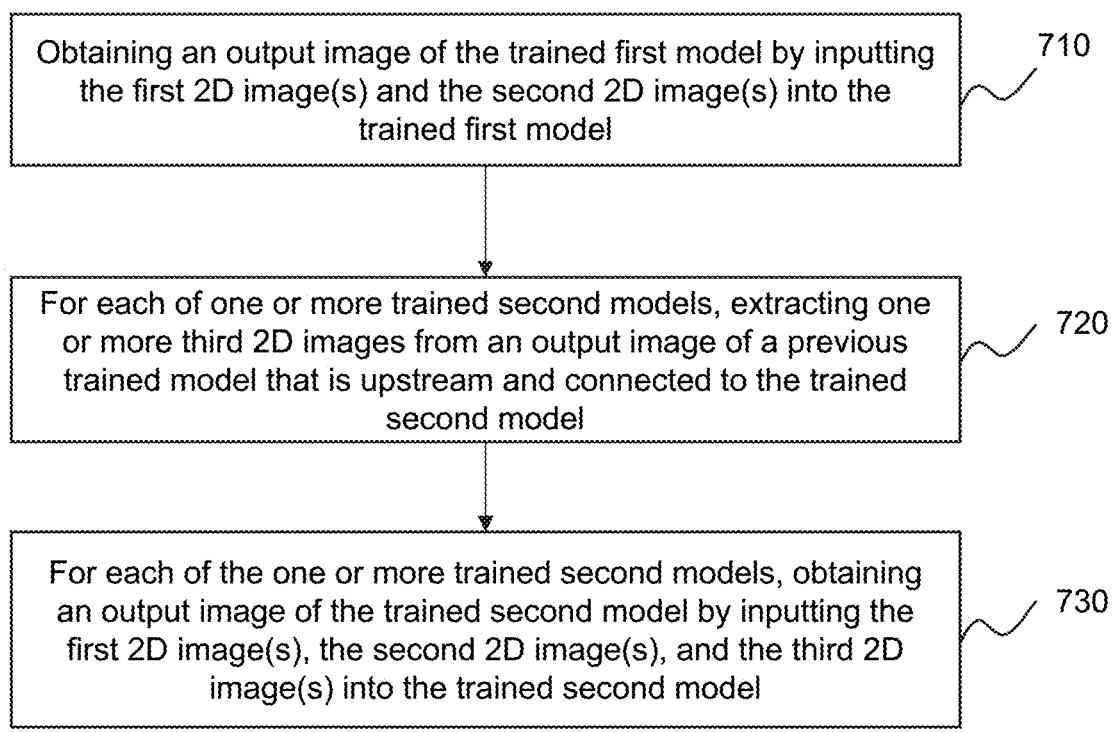
FIG. 7 is a flowchart illustrating an exemplary process for generating a target image of a subject by applying a trained cascaded neural network according to some embodiments of the present disclosure.

FIG. 7 is a flowchart illustrating an exemplary process for generating a target image of a subject by applying a trained cascaded neural network according to some embodiments of the present disclosure. In some embodiments, process 700 may be implemented as a set of instructions (e.g., an application) stored in a storage device (e.g., the storage device 150, storage 220, and/or storage 390). The processing device 140A (e.g., the processor 210, the CPU 340, and/or one or more modules illustrated in FIG. 4A) may execute the set of instructions, and when executing the instructions, the processing device 140A may be configured to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 7 and described below is not intended to be limiting. In some embodiments, one or more operations of the process 700 may be performed to achieve at least part of operation 630 as described in connection with FIG. 6

The trained cascaded neural network may be an exemplary embodiment of the image reconstruction model as described elsewhere in this disclosure (e.g., FIGS. 5 and 6 and the relevant descriptions). The trained cascaded neural network may include a plurality of trained models that are sequentially connected. The plurality of trained models may include a trained first model and one or more trained second models downstream to the trained first model. A trained model of the trained cascaded neural network may be of any type of models, such as a CNN model, a GAN model, or the like. The plurality of trained models of the trained cascaded neural network may be of the same type or different types.

In 710, the processing device 140A (e.g., the target image generation module 403) may obtain an output image of the trained first model by inputting the first 2D image(s) and the second 2D image(s) into the trained first model.

In some embodiments, the processing device 140A may directly input the first 2D image(s) and the second 2D image(s) into the trained cascaded neural network. Alternatively, the processing device 140A may generate one or more concatenated images (e.g., the first, second, and third concatenated images as described in connection with operation 630) by concatenating the first 2D image(s) and the second 2D image(s). The processing device 140A may further input the one or more concatenated images into the trained cascaded neural network. In some embodiments, the trained first model may have a same or similar configuration as the trained model 800 as shown in FIG. 8.

In 720, for each of the trained second model(s), the processing device 140A (e.g., the target image generation module 403) may extract one or more third 2D image from an output image of a previous trained model that is upstream and connected to the trained second model.

For example, for an $i^{th}$ trained second model, the processing device 140A may extract third 2D image(s) from an output image of an $(i-1)^{th}$ trained model of the trained cascaded neural network. The output image of the $(i-1)^{th}$ trained model may be a 3D image, and a third 2D image may extracted from the output image of the $(i-1)^{th}$ trained model along any direction. For example, the third 2D image(s) may include one or more third axial images, one or more third sagittal images, and one or more third coronal images extracted from the output image of the $(i-1)^{th}$ trained model.

In some embodiments, for each trained second model, the count of the third 2D image(s) of the may be equal to that of the first 2D image(s) (or the second 2D image(s)). Each of the third 2D image(s) may correspond to one of the first 2D image(s) and one of the second 2D image(s). As used herein, a first 2D image, a second 2D image, and a third 2D image may be regarded as corresponding to each other if they correspond to a same view (the axial view, the sagittal view, the coronal view) of a same portion (e.g., a same cross-section) of the subject.

In 730, for each of the trained second model(s), the processing device 140A (e.g., the target image generation module 403) may obtain an output image of the trained second model by inputting the first 2D image(s), the second 2D image(s), and the third 2D image (s) into the trained second model. The output image of the last trained second model of the trained cascaded neural network may be designated as an output of the trained cascaded neural network (e.g., the target image or the initial target image as described elsewhere in this disclosure).

For example, for the $i^{th}$ trained second model, the processing device 140A may obtain the corresponding output image by directly inputting the first 2D image(s), the second 2D image(s), and the third 2D image (s) into the $i^{th}$ trained second model. Alternatively, the processing device 140A may generate a fifth concatenated image by concatenating the first axial image(s), the second axial image(s), and the third axial image(s); a sixth concatenated image by concatenating by the first sagittal image(s), the second sagittal image(s), and third sagittal image(s); and a seventh concatenated image by concatenating by the first coronary image(s), the second coronary image(s), and the third coronary image(s). The processing device 140A may obtain the corresponding output image by further inputting the fifth, sixth, and seventh concatenated images into the $i^{th}$ trained second model.

It should be noted that the above description regarding process 700 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more operations may be added or omitted. In some embodiments, in 710, the input of the trained first model may be the (preprocessed) initial image and the (preprocessed) gradient image. Operation 710 may be omitted. In 730, the input of each trained second model may be the output image of a previous trained model that is upstream and connected to the trained second model and optionally the input of the trained first model. In some embodiments, in 730, the input of each trained second model may merely include the output image (or the third 2D image(s)) of the previous trained model connected to the trained second model.

Figure 9:
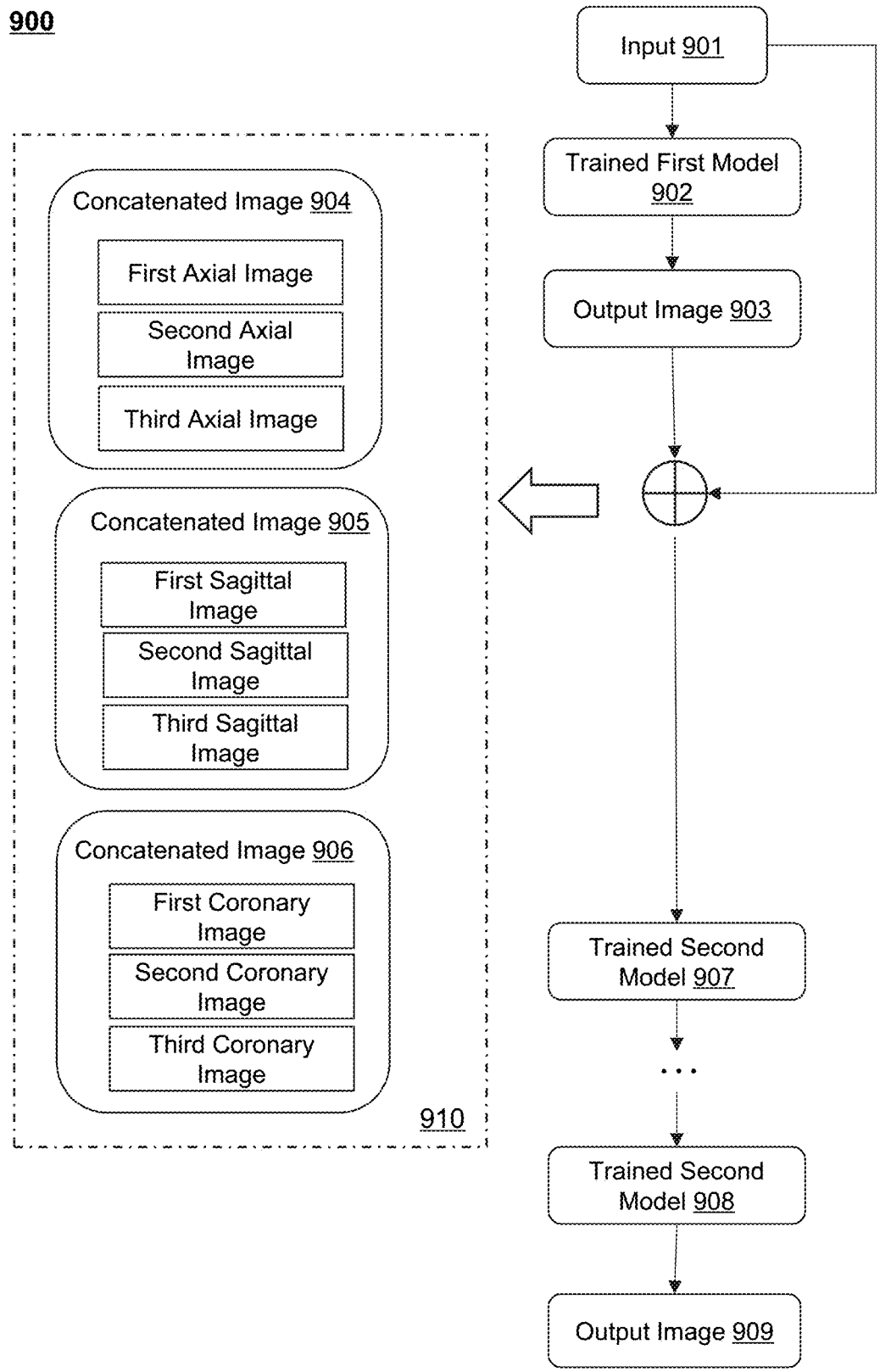
FIG. 9 is a schematic diagram illustrating an exemplary trained cascaded neural network according to some embodiments of the present disclosure.

FIG. 9 is a schematic diagram illustrating an exemplary trained cascaded neural network 900 according to some embodiments of the present disclosure. In some embodiments, the trained cascaded neural network 900 may be an exemplary embodiment of an image reconstruction model as described elsewhere in this disclosure (e.g., FIG. 5 and the relevant descriptions). The processing device 140A may use the trained cascaded neural network 900 to reconstruct a target image of a subject based on an initial image of the subject and optionally a gradient image associated with the initial image.

As shown in FIG. 9, the trained cascaded neural network 900 may include a trained first model 902 and a plurality of trained second models (e.g., 907, 908) downstream to the trained first model 902. The processing device 140A may obtain an input 901 of the trained cascaded neural network 900, and input the input 901 into the trained first model 902. For example, the input 901 may include the initial image and the corresponding gradient image (or a concatenated image of the initial image and the corresponding gradient image). As another example, the input 901 may include one or more first 2D images and one or more second 2D images. The first 2D image(s) may include one or more first axial images, one or more first sagittal images, and one or more first coronary images extracted from the initial image. The second 2D image(s) may include one or more second axial images, one or more second sagittal images, and one or more second coronary images extracted from the gradient image. As yet another example, the input 901 may include a first concatenated image, a second concatenated image, and a third concatenated image generated based on the first 2D image(s) and the second 2D image(s).

The trained first model 902 may be configured to process the input 901 and generate an output image 903. In some embodiments, the trained first model 902 may have a same or similar configuration as the trained model 800 as shown in FIG. 8. The output image 903 may be generated by an integration component of the trained first model 902.

The processing device 140A may then generate an input of the trained second model 907 based on the output image 903. For example, the input of the trained second model 907 may be the output image 903. As another example, the input of the trained second model 907 may be a combination of the output image 903 and the input 901 as shown in FIG. 9. In some embodiments, the processing device 140A may generate a concatenated image of the output image 903 and the input 901 as the input of the trained second model 907.

For example, the input 901 may include the first and second axial images, the first and second sagittal images, and the first and second coronary images. The processing device 140A may extract one or more third axial images, one or more third sagittal images, and one or more third coronal images from the output image 903. The processing device 140A may generate a concatenated image 904 by concatenating the first axial image(s), the second axial image(s), and the third axial image(s); a concatenated image 905 by concatenating by the first sagittal image(s), the second sagittal image(s), and third sagittal image(s); and a concatenated image 906 by concatenating the first coronary image(s), the second coronary image(s), and the third coronary image(s). The concatenated images 904, 905, and 906 may serve as an input 910 of the trained second model 907 as shown in FIG. 9. In some embodiments, the trained second model 907 may have a same or similar configuration as the trained model 800 as illustrated in FIG. 8. The concatenated images 904, 905, and 906 may be processed by an axial view component, a sagittal view component, and a coronary view component of the trained second model 907, respectively.

Similarly, for each of the other trained second model(s), the processing device 140A may generate an input of the trained second model based on an output image of a previous model connected to the trained second model and optionally the input 901. An output image 909 of the last trained second model 908 may be the output of the trained cascaded neural network 900. For example, the output image 909 may be designated as the target image. As another example, the output image 909 may be post-processed by the processing device 140A to generate the target image.

According to some embodiments of the present disclosure, the input 901 of the trained cascaded neural network 900 may be input into each trained second model in combination with an output image of a previous trained model connected to the trained second model. In this way, each trained second model may extract features from the original input 901 as well and the output of the previous trained model, which may avoid a loss of image data due to operation.

It should be noted that the example in FIG. 9 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. The operations of the illustrated process presented above are intended to be illustrative. The trained cascaded neural network 900 may include one or more additional components and/or without one or more of the components shown in FIG. 9. For example, the trained cascaded neural network 900 may include any count of trained second models.

Figure 10:
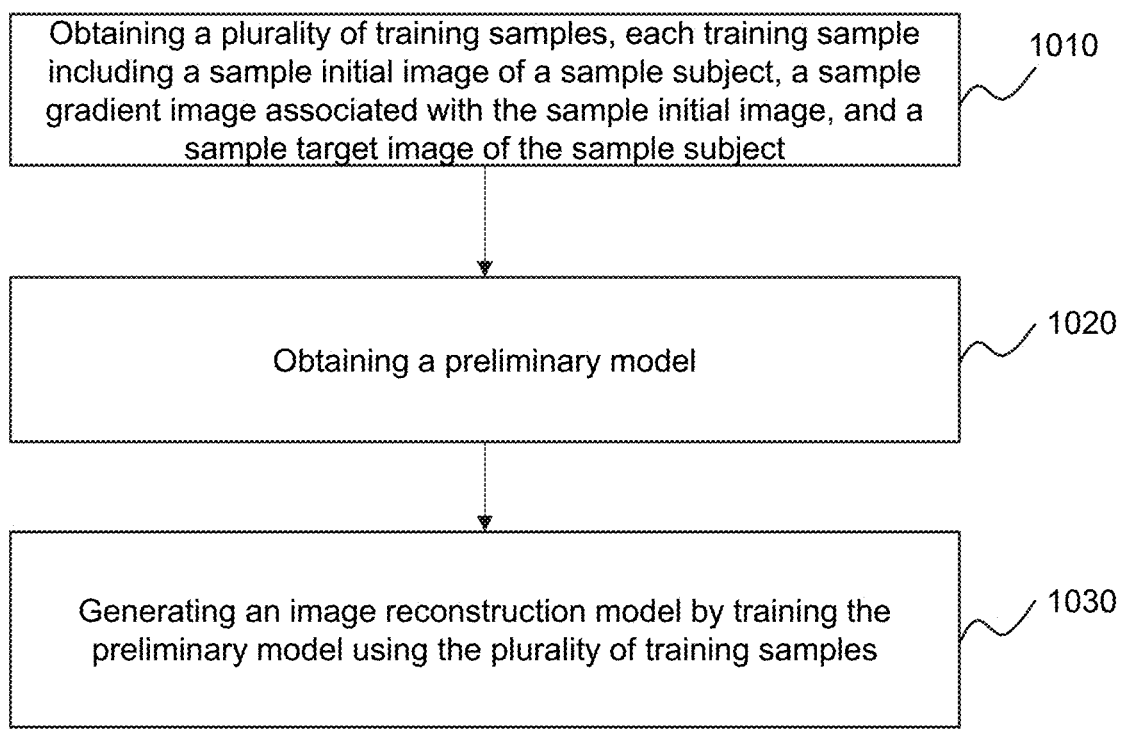
FIG. 10 is a flowchart illustrating an exemplary process for generating an image reconstruction model according to some embodiments of the present disclosure.

FIG. 10 is a flowchart illustrating an exemplary process for generating an image reconstruction model according to some embodiments of the present disclosure. In some embodiments, process 1000 may be implemented as a set of instructions (e.g., an application) stored in a storage device (e.g., the storage device 150, storage 220, and/or storage 390). The processing device 140B (e.g., the processor 210, the CPU 340, and/or one or more modules illustrated in FIG. 4B) may execute the set of instructions, and when executing the instructions, the processing device 140B may be configured to perform process 1000. In some embodiments, the process 1000 may be performed by another device or system other than the imaging system 100, e.g., a device or system of a vendor of a manufacturer. For illustration purposes, the implementation of the process 1000 by the processing device 140B is described as an example.

In 1010, the processing device 140B (e.g., the acquisition module 404) may obtain a plurality of training samples. Each of the plurality of training samples may include a sample initial image of a sample subject, a sample gradient image associated with the sample initial image, and a sample target image (or referred to as a ground truth target image) of the sample subject. The sample target image of each training sample may have a higher image quality than the sample initial image of the training sample.

For a training sample, the corresponding sample subject may be of the same type as or a different type from the subject as described in connection with 510. For example, the subject may be the heart of a patient, and the sample subject may be the heart of another patient. The sample initial image refers to an image generated based on first scan data of the sample subject that is collected by a sample imaging device (e.g., a PET device, a PET/CT device) at a first instance. The sample target image refers to an image generated based on second scan data of the sample subject that is collected by the sample imaging device at a second instance. The sample gradient image associated with the sample initial image refers to any image that includes detail information (e.g., edge information, texture information, color information) of the sample initial image.

In some embodiments, the first instance may correspond to a first set of values of a parameter set (e.g., one or more scanning parameters of the sample imaging device), and the second instance may correspond to a second set of values of the parameter. The first value of at least one parameter (e.g., a radiation dose, a scan time, a patient movement) may be different from the second value of the at least one parameter, wherein the value difference may induce the difference of the image quality between the sample initial image and the sample target image of the training sample. Merely by way of example, the sample initial image of the training sample may correspond to a first radiation dose associated with the sample subject, and the sample target image may correspond to a second radiation dose associated with the sample subject. The second radiation dose may be higher than the first radiation dose. The sample target image corresponding to the second radiation dose may have a higher image quality than the sample initial image. More descriptions regarding the first and second radiation doses may be found elsewhere in the disclosure. See, e.g., FIG. 5 and relevant descriptions thereof.

In some embodiments, the first radiation dose may be represented in the form of a first value, and the sample initial images of different training samples may correspond to a same radiation dose having the first value. As another example, the first radiation dose may be represented in the form of a first value range. The sample initial images of different training samples may correspond to a same radiation dose or different radiation doses within the first value range. Similarly, the second radiation dose may be represented in the form of a second value or a second value range. The sample target images of different training samples may correspond to a same radiation dose having the second value or within the second value range, or different radiation doses within the second value range.

In some embodiments, at least a portion of the training sample may be generated by the processing device 140B. For example, the processing device 140B may acquire the first and second scan data of the sample subject from the sample imaging device or a storage device (e.g., the storage 220, the storage 390, or an external source) that stores the first and second scan data. The processing device 140B may reconstruct the sample initial image based on the first scan data, and the sample target image based on the second scan data according to an image reconstruction algorithm. The processing device 140B may further generate the sample gradient image by processing the sample initial image. The generation of the sample gradient image based on the sample initial image may be performed in a similar manner with that of the gradient image based on the initial image as described in connection with operation 520, and the descriptions thereof are not repeated here.

Optionally, the processing device 140B may further preprocess one or more of the sample initial image, the sample target image, and the sample gradient image of the training sample to generate a preprocessed training sample. For example, the image reconstruction model may correspond to a target image resolution. If the image resolution of the sample initial image is different from the target image resolution, the processing device 140B may generate a resampled sample initial image having the target image resolution. The processing device 140B may further normalize the resampled sample initial image to generate a preprocessed sample initial image. As another example, if the image resolution of the sample target image is different from the target image resolution, the processing device 140B may generate a resampled sample target image having the target image resolution. The processing device 140B may further normalize the resampled sample target image to generate a preprocessed sample target image. As yet another example, the processing device 140B may generate a preprocessed gradient image by normalizing the sample gradient image.

In some alternative embodiments, the training sample (or a portion thereof) or the preprocessed training sample (or a portion thereof) may be previously generated by a computing device (e.g., the processing device 140B) and stored in a storage device (e.g., the storage device 150, the storage 220, the storage 390, or an external database). The processing device 140B may retrieve the training sample (or a portion thereof) or the preprocessed training sample (or a portion thereof) directly from the storage device. For illustration purposes, the following descriptions are described with reference to generating the image reconstruction model based on the training samples. This is not intended to be limiting, and the image reconstruction model may be generated based on the preprocessed training samples according to some other embodiments of the present disclosure.

In 1020, the processing device 140B (e.g., the acquisition module 404) may obtain a preliminary model.

The preliminary model may be of any type of neural network model, for example, a neural network model (e.g., a CNN model, a GAN model, a cascaded neural network, or the like). In some embodiment, the preliminary model may be a cascaded neural network model including a first model and one or more second models downstream to the first model. For example, the preliminary model may be trained to generate the trained cascaded neural network 900 as shown in FIG. 9, wherein the first model may be trained to generate the trained first model 902, and the one or more second models may be trained to generate the trained second models 907, 908, or the like. In some embodiments, the processing device 140B may extract multi-view information (e.g., sample first 2D image(s) and sample second 2D image(s)) from each training sample. The preliminary model may include multiple components configured to process the multi-view information of each training sample. More descriptions regarding the processing of the multi-view information of each training sample may be found elsewhere in the present disclosure. See, e.g., FIG. 11 and relevant descriptions thereof.

In some embodiments, the preliminary model may include one or more model parameters. For example, the preliminary model may be a CNN model and exemplary model parameters of the preliminary model may include the number (or count) of layers, the number (or count) of kernels, a kernel size, a stride, a padding of each convolutional layer, a loss function, or the like, or any combination thereof. Before training, the model parameter(s) may have their respective initial values. For example, the processing device 140B may initialize parameter value(s) of the model parameter(s) of the preliminary model.

In 1030, the processing device 140B (e.g., the model generation module 405) may generate the image reconstruction model by training the preliminary model using the plurality of training samples.

In some embodiments, the preliminary model may be trained according to a machine learning algorithm as described elsewhere in this disclosure (e.g., FIG. 5 and the relevant descriptions). For example, the processing device 140B may generate the image reconstruction model according to a supervised machine learning algorithm by performing one or more iterations to iteratively update the model parameter(s) of the preliminary model. For illustration purposes, an exemplary current iteration of the iteration(s) is described in the following description. The current iteration may be performed based on at least a portion of the training samples. In some embodiments, a same set or different sets of training samples may be used in different iterations in training the preliminary model.

In the current iteration, for each of at least a portion of the plurality of training samples, the processing device 140B may generate a predicted target image of the corresponding training subject by inputting a training input into an updated preliminary model determined in a previous iteration. For example, the training input of the updated preliminary model may include the sample initial image and the sample gradient image of each training sample. As another example, the training input of the updated preliminary model may include one or more sample first 2D images and one or more sample second 2D images of each training sample (which will be described in detail in connection with FIG. 11).

The processing device 140B may then determine a value of a loss function of the updated preliminary model based on the predicted target image and the sample target image of each of the at least a portion of the plurality of training samples. The loss function may be used to evaluate the accuracy and reliability of the updated preliminary model, for example, the smaller the loss function is, the more reliable the updated preliminary model is. Exemplary loss functions may include an L1 loss function, a focal loss function, a log loss function, a cross-entropy loss function, a Dice loss function, etc. The processing device 140B may further update the value(s) of the model parameter(s) of the updated preliminary model to be used in a next iteration based on the value of the loss function according to, for example, a backpropagation algorithm.

In some embodiments, the one or more iterations may be terminated if a termination condition is satisfied in the current iteration. An exemplary termination condition may be that the value of the loss function obtained in the current iteration is less than a predetermined threshold. Other exemplary termination conditions may include that a certain count of iterations is performed, that the loss function converges such that the differences of the values of the loss function obtained in consecutive iterations are within a threshold, etc. If the termination condition is satisfied in the current iteration, the processing device 140B may designate the updated preliminary model as the image reconstruction model.

In some embodiments, the processing device 140B may adopt a specific learning rate schedule in training the preliminary model. For example, an adaptive learning rate schedule, such as a time-based decay schedule, a step decay schedule, or an exponential decay schedule, may be adopted. Merely by way of example, an initial learning rate of the preliminary model may be equal to 0.0001, and dropped by half every 10,000 epochs in model training, which may facilitate a convergence of the preliminary model. Additionally or alternatively, the processing device 140B may adopt a specific technique, such as a drop-out algorithm, a weight-decay algorithm, in training the preliminary model to prevent the preliminary model from overfitting.

In some alternative embodiments, each training sample may merely include a sample initial image and a sample target image. The preliminary model may be trained to learn detail information of the sample initial image of each training sample. For example, the loss function of the preliminary model may incorporate a perceptual loss and/or a gradient loss. However, in such cases, with the increase of the depth of the preliminary model, the amount of the detail information may increase, which may result in overfitting. Compared with learning the detail information in model training, using a training sample that includes a sample gradient image may reduce the computational complexity and/or cost, and avoid overfitting.

Figure 11:
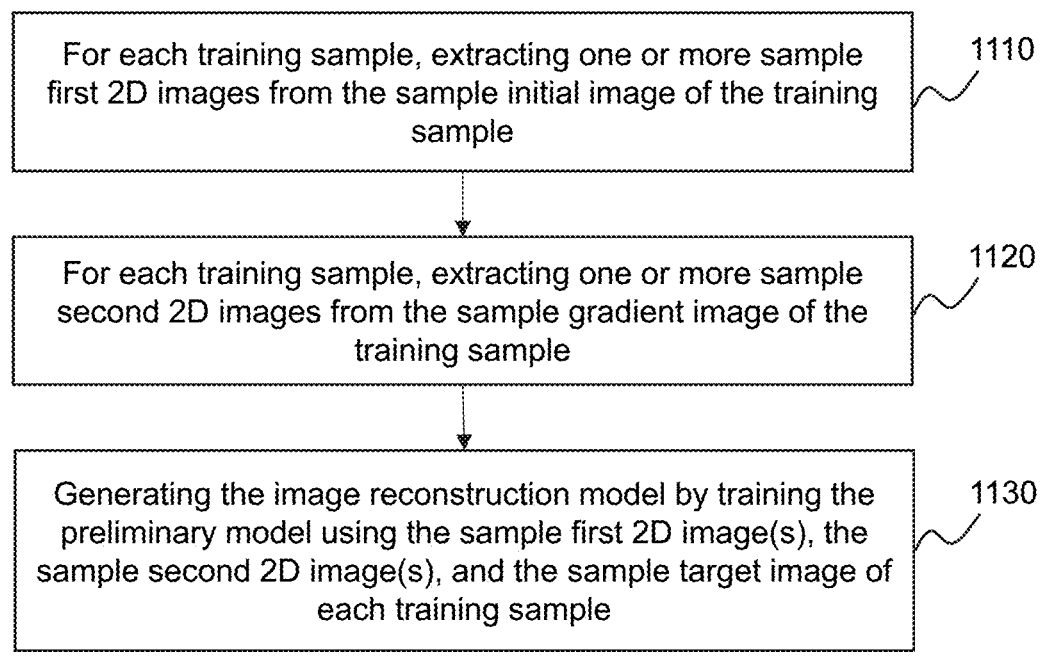
FIG. 11 is a flowchart illustrating an exemplary process for training a preliminary model using a plurality of training samples according to some embodiments of the present disclosure.

In some embodiments, the processing device 140B may perform one or more operations in process 1100 as shown in FIG. 11 to train the preliminary model using the plurality of training samples.

In 1110, for each training sample, the processing device 140B (e.g., the model generation module 405) may extract one or more sample first 2D images from the sample initial image of the training sample. For example, the sample first 2D image(s) of a training sample may include one or more sample first axial images, one or more sample first sagittal images, and one or more sample first coronal images extracted from the corresponding sample initial image. The extraction of the sample first 2D image(s) from a sample initial image may be performed in a similar manner with that of the first 2D image(s) from the initial image as described in connection with operation 610, and the descriptions thereof are not repeated here.

In 1120, for each training sample, the processing device 140B (e.g., the model generation module 405) may extract one or more sample second 2D images from the sample gradient image of the training sample. For example, the sample second 2D image(s) of a training sample may include one or more sample second axial images, one or more sample second sagittal images, and one or more sample second coronal images extracted from the corresponding sample gradient image. The extraction of the sample second 2D image(s) from a sample gradient image may be performed in a similar manner with that of the second 2D image(s) from the gradient image as described in connection with operation 620, and the descriptions thereof are not repeated here.

In 1130, the processing device 140B may generate the image reconstruction model by training the preliminary model using the sample first 2D image(s), the sample second 2D image(s), and the sample target image of each of the plurality of training samples.

For example, for each training sample, the processing device 140B may concatenate the sample first 2D image(s) and the sample second 2D image(s) of the training sample into one or more sample concatenated images. Merely by way of example, the processing device 140B may generate a sample first concatenated image by concatenating the sample first axial image(s) and the sample second axial image(s) of the training sample; a sample second concatenated image by concatenating the sample first sagittal image(s) and the sample second sagittal image(s); and a sample third concatenated image by concatenating the sample first coronary image(s) and the sample second coronary image(s). In some embodiments, the concatenation of the sample first 2D image(s) and the sample second 2D image(s) may be performed in a similar manner with the concentration of the first 2D image(s) and the second 2D image(s) as described in the operation 630, and the descriptions thereof are not repeated here.

The processing device 140B may further train the preliminary model using the sample concatenated image(s) and the sample target image of each training sample. For example, in an iterative training process of the preliminary model, the sample concatenated image(s) of each training sample may serve as a training input of the updated preliminary model determined in a previous iteration to generate a predicted target image of the training sample. The predicted target image and the sample target image of each training sample may then be used to determine the value of the loss function and further update the updated preliminary model.

In some embodiments, the preliminary model may include a first component, a second component, a third component, and a fourth component. For a training sample, the first component may be configured to generate a sample first feature map by processing the sample first concatenated image of the training sample. The second component may be configured to generate a sample second feature map by processing the sample second concatenated image of the training sample. The third component may be configured to generate a sample third feature map by processing the sample third concatenated image of the training sample. The fourth component may be configured to process the sample first feature map, the sample second feature map, and the sample third feature map of the training sample. In some embodiments, the first, second, third, and fourth components may be trained to generate the axial view component 810, the sagittal view component 820, the coronary view component 830, and the integration component 840 of the trained model 800 as shown in FIG. 8, respectively.

Figure 12:
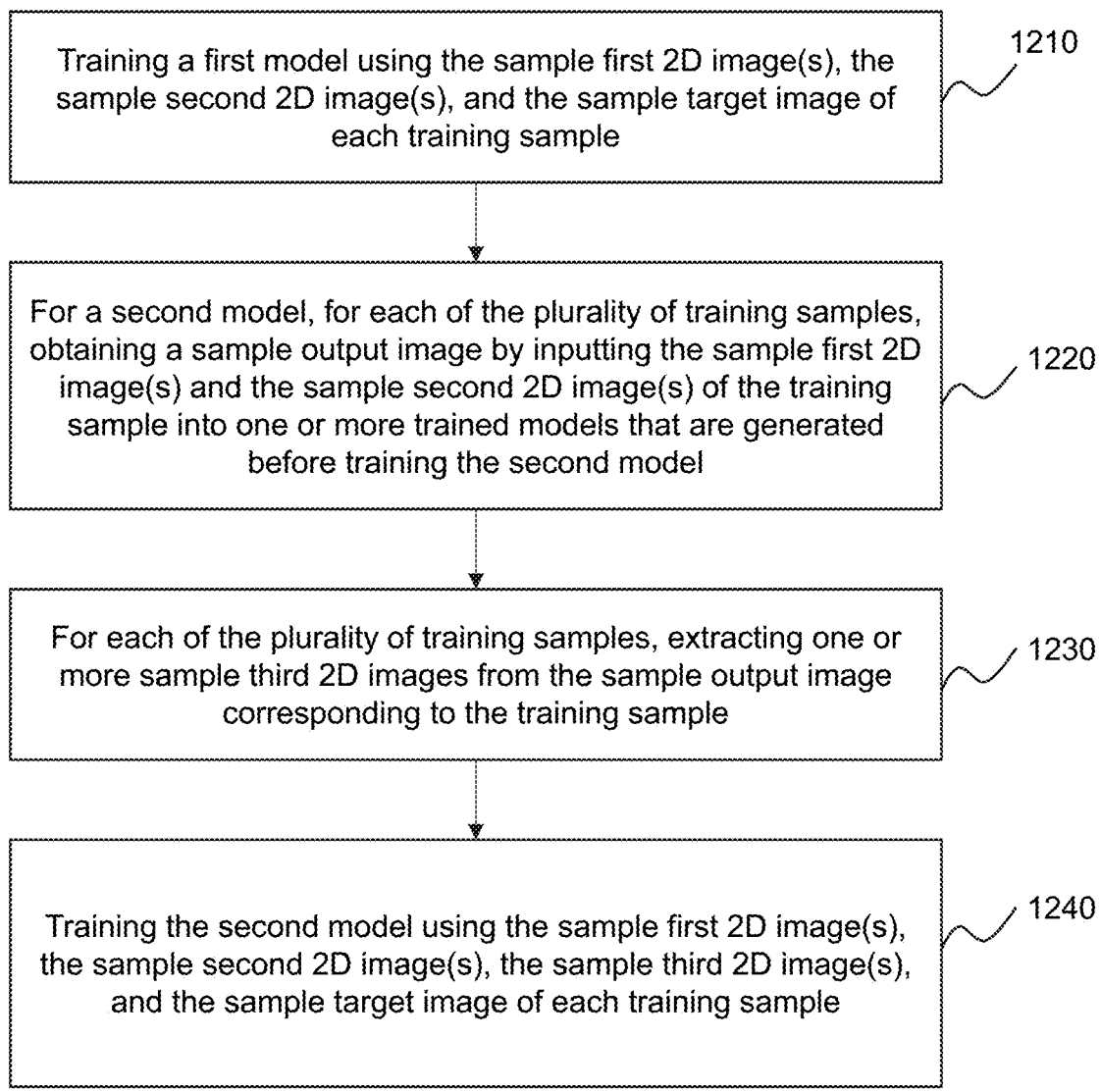
FIG. 12 is a flowchart illustrating an exemplary process for training a cascaded neural network according to some embodiments of the present disclosure.

In some embodiments, the preliminary model may be a cascaded neural network that includes a plurality of sequentially connected models. The models may include a first model and one or more second models downstream to the first model. The processing device 140B may perform process 1200 as shown in FIG. 12 to sequentially train the first model and the second model(s) using the training samples, so as to generate the image reconstruction model. Optionally, each of the models of the cascaded neural network may include the first, second, third, and fourth components as aforementioned.

In 1210, the processing device 140B (e.g., the model generation module 405) may train the first model using the sample first 2D image(s), the sample second 2D image(s), and the sample target image of each of the plurality of training samples.

In some embodiments, the training of the first model using the sample first 2D image(s), the sample second 2D image(s), and the sample target image of each training sample may be performed in a similar manner as training of the preliminary model using the sample first 2D image(s), the sample second 2D image(s), and the sample target image of each training sample as described in connection with operation 1130. For example, the processing device 140B may train the first model by iteratively updating value(s) of one or more model parameters of the first mode according to the sample first 2D image(s), the sample second 2D image(s), and the sample target image of each training sample.

After the trained first model is generated, the processing device 140B may sequentially train the second model(s) according to a deep auto-context learning strategy. For example, for each second model, operations 1220 to 1240 may be performed. After a specific second model is trained, the training of a next second model that is downstream and connected to the specific second model may be performed. For illustration purposes, an implementation of operations 1220-1240 for one of the second model(s) is described hereinafter.

In 1220, for each training sample, the processing device 140B (e.g., the model generation module 405) may obtain a sample output image by inputting the sample first 2D image(s) and the sample second 2D image(s) of the training sample into the one or more trained models that are generated before the training of the second model.

For example, the cascaded neural network may include a first model (denoted as P1) and q second models (denoted as Q1 to Qq). For an $j^{th}$ second model, the one or more trained models generated before the training of the $j^{th}$ second model may include the trained P1, the trained Q1, the trained Q2, . . . , and the trained Q(q−1). In some embodiments, for a training sample, the processing device 140B may directly input the sample first 2D image(s) and the sample second 2D image(s) into the trained model(s) to obtain the sample output image. Alternatively, the processing device 140B may input the sample concatenated image(s) of the sample first 2D image(s) and the sample second 2D image(s) into the trained model(s) to obtain the sample output image.

In 1230, for each training sample, the processing device 140B (e.g., the model generation module 405) may extract one or more sample third 2D images from the sample output image corresponding to the training sample.

The sample output image of a training sample obtained in 1220 may be a 3D image, and a sample third 2D image may be extracted from the sample output image along any direction. For example, the sample third 2D image(s) may include one or more sample third axial images, one or more sample third sagittal images, and one or more sample third coronal images extracted from the sample output image. In some embodiments, extraction of the sample third 2D image(s) from a sample output image may be performed in a similar manner as that of the third 2D image(s) from the output image as described in connection with operation 720.

In 1240, the processing device 140B (e.g., the model generation module 405) may train the second model using the sample first 2D image(s), the sample second 2D image(s), the sample third 2D image(s), and the sample target image of each training sample.

In some embodiments, the training of the second model may include one or more second iterations to iteratively update value(s) of model parameter(s) of the second model.

For example, in a current second iteration, the processing device 140B may input the sample first 2D image(s), the sample second 2D image(s), the sample third 2D image(s) of each training sample into the updated second model determined in a previous second iteration to generate a second predicted target image of the training sample. As another example, for each training sample, the processing device 140B may generate a sample fifth concatenated image by concatenating the sample first axial image(s), the sample second axial image(s), and the sample third axial image(s); a sample sixth concatenated image by concatenating the sample first sagittal image(s), the sample second sagittal image(s), and the sample third sagittal image(s); and a sample seventh concatenated image by concatenating the sample first coronary image(s), the sample second coronary image(s), and the sample third coronary image(s). The processing device 140B may further input the sample fifth, sixth, and seventh concatenated images into the updated second model to obtain the second predicted target image. The processing device 140B may determine a value of a second loss function based on the second predicted target image and the sample target image of each training sample. The processing device 140B may further update the updated second model based on the value of the second loss function until a second termination condition is satisfied. The second termination condition may be similar to the termination condition as described in connection with FIG. 10.

According to some embodiments of the present disclosure, the cascaded neural network may be trained using a deep auto-context learning strategy. By using the deep auto-context learning strategy, the training input may be inputted into each of the models during the training process. This may avoid a loss of image data due to operations (e.g., a convolutional operation) performed in training. In addition, a difference between a sample output image of each model and the sample target image of each training sample may be reduced gradually, thereby generating an image reconstruction model with improved accuracy and reliability.

In some alternative embodiments, the models of the cascaded neural network may be trained simultaneously. For example, in an iterative training process of the cascaded neural network, the processing device 140B may input the sample first 2D image(s) and the sample second 2D image(s) of each training sample into the cascaded neural network. An output image of the last second model of the cascaded neural network may be designated as a predicted target image of each training sample. The processing device 140B may further jointly update model parameter(s) of each model of the cascaded neural network based on the predicted target image and the sample target image of each training sample. Additionally or alternatively, the cascaded neural network may be trained using the original training samples (e.g., the sample initial image, the sample gradient image, and the sample target image of each training sample). In some embodiments, different models of the cascaded neural network may be trained using a same set or different sets of training samples.

It should be noted that the above descriptions regarding the process 1000 to 1200 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, the order of the process 1000, 1100, and/or 1200 is not intended to be limiting. For example, the operation 1020 may be performed before operation 1010 or operations 1010 and 1020 may be performed simultaneously.

In some embodiments, one or more operations may be added or omitted. For example, after the image reconstruction model is generated, the processing device 140B may further test the image reconstruction model using a set of testing samples. Additionally or alternatively, the processing device 140B may update the image reconstruction model periodically or irregularly based on one or more newly-generated training images (e.g., new sample initial images generated in medical diagnosis).

In some embodiments, the processing device 140B may extract one or more image patches from one or more images as aforementioned (e.g., a sample initial image, a sample gradient image, a sample first 2D image, a sample second 2D image, a sample concatenated image, a sample output image), and use the image patches in the training process of the preliminary model. Merely by way of example, a plurality of first image patches each having a size of 64*64*10 may be extracted from the sample initial image and the sample gradient image of each training sample, and be used in training the preliminary model. As another example, a plurality of second image patches each having a size of 64*64*1 may be extracted from the sample first 2D image(s) and the sample second 2D image(s) of each training sample. The first and second sample concatenated images of each training sample may be generated based on the second image patches.

FIG. 13A is a schematic diagram illustrating an exemplary sample initial image 1300A according to some embodiments of the present disclosure. FIG. 13B is a schematic diagram illustrating an exemplary predicted target image 1300B according to some embodiments of the present disclosure. FIG. 13C is a schematic diagram illustrating an exemplary sample target image 1300C according to some embodiments of the present disclosure. The sample initial image 1300A and the sample target image 1300C are PET images of a first patient. The sample initial image 1300A was reconstructed based on image data collected by a PET/CT scanner and corresponds to a first radiation dose. The sample target image 1300C was reconstructed based on image data collected by the PET/CT scanner and corresponds to a second radiation dose higher than the first radiation dose. The predicted target image 1300B was generated based on the sample initial image 1300A by applying an image reconstruction model as described elsewhere in this disclosure (e.g., FIG. 5 and the relevant descriptions). The predicted target image 1300B corresponds to the second radiation dose. As shown in FIGS. 13A to 13C, the predicted target image 1300B and the sample target image 1300C have a lower noise level than the sample initial image 1300A. The standardized uptake value (SUV) of the predicted target image 1300B is close to that of the sample target image 1300C.

Figure 14A:
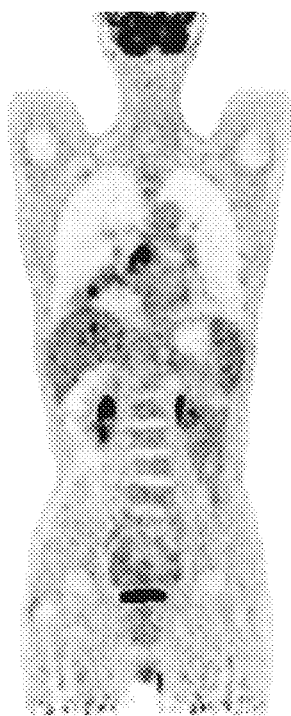
FIG. 14A is a schematic diagram illustrating an exemplary sample initial image according to some embodiments of the present disclosure.
Figure 14B:
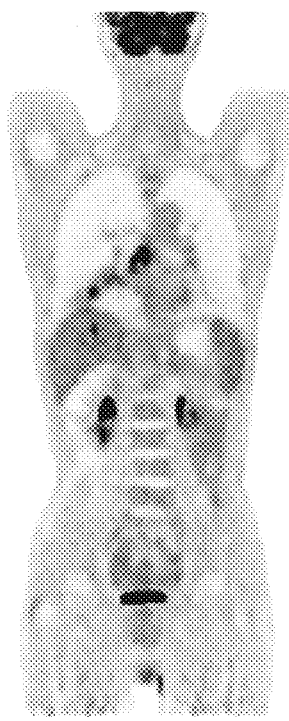
FIG. 14B is a schematic diagram illustrating an exemplary predicted target image according to some embodiments of the present disclosure.
Figure 14C:
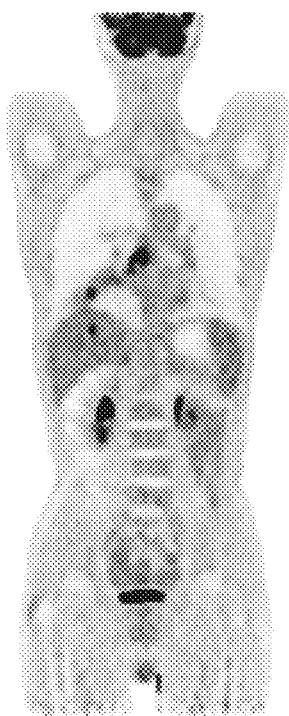
FIG. 14C is a schematic diagram illustrating an exemplary sample target image according to some embodiments of the present disclosure.

FIG. 14A is a schematic diagram illustrating an exemplary sample initial image 1400A according to some embodiments of the present disclosure. FIG. 14B is a schematic diagram illustrating an exemplary predicted target image 1400B according to some embodiments of the present disclosure. FIG. 14C is a schematic diagram illustrating an exemplary sample target image 1400C according to some embodiments of the present disclosure. The sample initial image 1400A and the sample target image 1400C are PET images of a second patient. The sample initial image 1400A was reconstructed based on image data collected by a PET/CT scanner and corresponds to the first radiation dose.

The sample target image 1400C was reconstructed based on image data collected by the PET/CT scanner and corresponds to the second radiation dose. The predicted target image 1400B was generated based on the sample initial image 1400A by applying an image reconstruction model as described elsewhere in this disclosure (e.g., FIG. 5 and the relevant descriptions). The predicted target image 1400B corresponds to the second radiation dose. As shown in FIGS. 14A to 14C, the predicted target image 1400B and the sample target image 1400C have a lower noise level than the sample initial image 1400A. The SUV of the predicted target image 1400B is close to that of the sample target image 1400C.

Figure 15A:
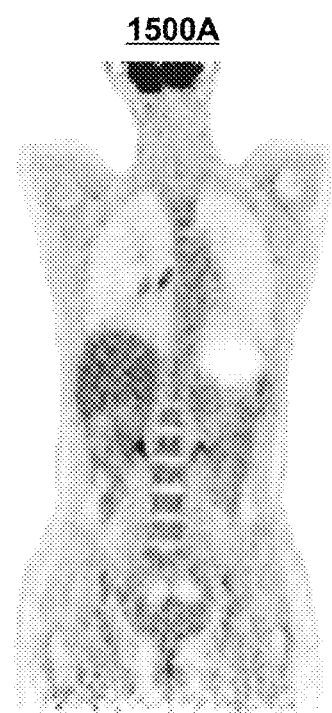
FIG. 15A is a schematic diagram illustrating an exemplary sample initial image according to some embodiments of the present disclosure.
Figure 15B:
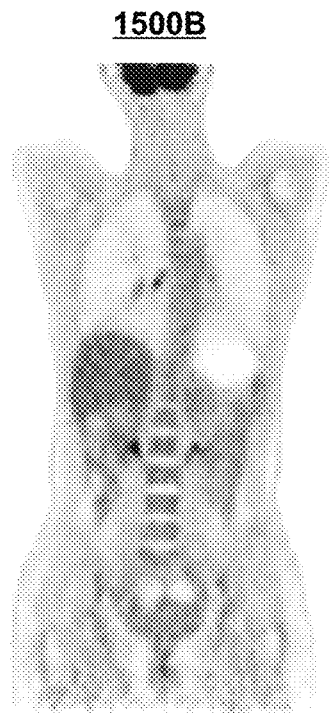
FIG. 15B is a schematic diagram illustrating an exemplary predicted target image according to some embodiments of the present disclosure.
Figure 15C:
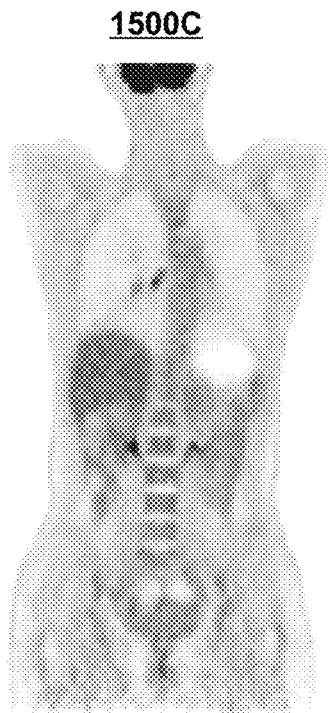
FIG. 15C is a schematic diagram illustrating an exemplary sample target image according to some embodiments of the present disclosure.

FIG. 15A is a schematic diagram illustrating an exemplary sample initial image 1500A according to some embodiments of the present disclosure. FIG. 15B is a schematic diagram illustrating an exemplary predicted target image 1500B according to some embodiments of the present disclosure. FIG. 15C is a schematic diagram illustrating an exemplary sample target image 1500C according to some embodiments of the present disclosure. The sample initial image 1500A and the sample target image 1500C are PET images of a third patient. The sample initial image 1500A was reconstructed based on image data collected by a PET/CT scanner and corresponds to the first radiation dose. The sample target image 1500C was reconstructed based on image data collected by the PET/CT scanner and corresponds to the second radiation dose. The predicted target image 1500B was generated based on the sample initial image 1500A by applying an image reconstruction model as described elsewhere in this disclosure (e.g., FIG. 5 and the relevant descriptions). The predicted target image 1500B corresponds to the second radiation dose. As shown in FIGS. 15A to 15C, the predicted target image 1500B and the sample target image 1500C have a lower noise level than the sample initial image 1500A. The SUV of the predicted target image 1500B is close to that of the sample target image 1500C.

According to FIGS. 13A to 15C, the systems and methods disclosed herein may be used to reconstruct PET images corresponding to the second radiation dose without increasing radiation damage and without increasing the scan time.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer-readable media having computer-readable program code embodied thereon.

A non-transitory computer-readable signal medium may include a propagated data signal with computer readable program code embodied therein, for example, in baseband or as part of a carrier wave. Such a propagated signal may take any of a variety of forms, including electromagnetic, optical, or the like, or any suitable combination thereof. A computer-readable signal medium may be any computer-readable medium that is not a computer-readable storage medium and that may communicate, propagate, or transport a program for use by or in connection with an instruction execution system, apparatus, or device. Program code embodied on a computer-readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object-oriented programming language such as Java, Scala, Smalltalk, Eiffel, JADE, Emerald, C++, C #, VB. NET, Python or the like, conventional procedural programming languages, such as the "C" programming language, Visual Basic, Fortran, Perl, COBOL, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof to streamline the disclosure aiding in the understanding of one or more of the various inventive embodiments. This method of disclosure, however, is not to be interpreted as reflecting an intention that the claimed object matter requires more features than are expressly recited in each claim. Rather, inventive embodiments lie in less than all features of a single foregoing disclosed embodiment.

In some embodiments, the numbers expressing quantities, properties, and so forth, used to describe and claim certain embodiments of the application are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting effect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system for image reconstruction, comprising:
   at least one storage device including a set of instructions; and
   at least one processor configured to communicate with the at least one storage device, wherein when executing the set of instructions, the at least one processor is configured to direct the system to perform operations including:
   obtaining an initial image of a subject, the initial image being generated based on scan data of the subject that is collected by an imaging device;
   generating a gradient image associated with the initial image;
   determining a model input based on the initial image and the gradient image; and
   generating a target image of the subject by inputting the model input into an image reconstruction model, the target image having a higher image quality than the initial image.

2. The system of claim 1, wherein each of the initial image and the gradient image is a 3-dimensional (3D) image, and the determining a model input based on the initial image and the gradient image includes:
   extracting at least one first 2-dimensional (2D) image from the initial image;
   extracting at least one second 2D image from the gradient image; and
   determining, based on the at least one first 2D image and the at least one second 2D image, the model input.

3. The system of claim 2, wherein:
   the at least one first 2D image includes at least one first axial image, at least one first sagittal image, and at least one first coronary image extracted from the initial image; and
   the at least one second 2D image includes at least one second axial image, at least one second sagittal image, and at least one second coronary image extracted from the gradient image.

4. The system of claim 3, wherein the determining, based on the at least one first 2D image and the at least one second 2D image, the model input includes:
   generating a first concatenated image by concatenating the at least one first axial image and the at least one second axial image;
   generating a second concatenated image by concatenating the at least one first sagittal image and the at least one second sagittal image;
   generating a third concatenated image by concatenating the at least one first coronary image and the at least one second coronary image; and
   determining the model input based on the first concatenated image, the second concatenated image, and the third concatenated image.

5. The system of claim 4, wherein the image reconstruction model includes:
   an axial view component configured to generate a first feature map by processing the first concatenated image;
   a sagittal view component configured to generate a second feature map by processing the second concatenated image;
   a coronary view component configured to generate a third feature map by processing the third concatenated image; and
   an integration component configured to generate an output image by processing the first feature map, the second feature map, and the third feature map, wherein the target image is generated based on the output image of the integration component.

6. The system of claim 2, wherein the image reconstruction model is a trained cascaded neural network including a plurality of trained models that are sequentially connected, the plurality of trained models include a trained first model and one or more trained second models downstream to the trained first model, and the generating the target image by applying the image reconstruction model on the at least one first 2D image and the at least one second 2D image includes:

obtaining an output image of the trained first model by inputting the at least one first 2D image and the at least one second 2D image into the trained first model;

for each of the one or more trained second models,
extracting at least one third 2D image from an output image of a previous trained model connected to the trained second model; and
obtaining an output image of the trained second model by inputting the at least one first 2D image, the at least one second 2D image, and the at least one third 2D image into the trained second model, wherein the target image is generated based on an output image of the last trained second model of the trained cascaded neural network.

7. The system of claim 1, wherein the scan data of the initial image corresponds to a first radiation dose associated with the subject, and the target image corresponds to a second radiation dose higher than the first radiation dose.

8. The system of claim 1, wherein the image reconstruction model corresponds to a target image resolution, the initial image has an image resolution different from the target image resolution, and the at least one processor is further configured to direct the system to perform the operations including:
generating a resampled initial image having the target image resolution by resampling the initial image;
generating a preprocessed initial image by normalizing the resampled initial image; and
generating a preprocessed gradient image by normalizing the gradient image, and wherein the determining a model input based on the initial image and the gradient image includes:
determining, based on the preprocessed initial image and the preprocessed gradient image, the model input.

9. The system of claim 1, wherein the image quality relates to at least one of an image resolution, a noise level, a contrast ratio, or a sharpness.

10. The system of claim 1, wherein the image reconstruction model is further configured to reduce noise in the initial image.

11. The system of claim 1, wherein the image reconstruction model includes a neural network model.

12. A method for image reconstruction implemented on a computing device having at least one processor and at least one storage device, the method comprising:
obtaining an initial image of a subject, the initial image being generated based on scan data of the subject that is collected by an imaging device;
generating a gradient image associated with the initial image;
determining a model input based on the initial image and the gradient image; and
generating a target image of the subject by inputting the model input into an image reconstruction model, the target image having a higher image quality than the initial image.

13. The method of claim 12, wherein each of the initial image and the gradient image is a 3-dimensional (3D) image, and the determining a model input based on the initial image and the gradient image includes:
extracting at least one first 2-dimensional (2D) image from the initial image;
extracting at least one second 2D image from the gradient image; and
determining, based on the at least one first 2D image and the at least one second 2D image, the model input.

14. The method of claim 13, wherein:
the at least one first 2D image includes at least one first axial image, at least one first sagittal image, and at least one first coronary image extracted from the initial image; and
the at least one second 2D image includes at least one second axial image, at least one second sagittal image, and at least one second coronary image extracted from the gradient image.

15. The method of claim 14, wherein the determining, based on the at least one first 2D image and the at least one second 2D image, the model input includes:
generating a first concatenated image by concatenating the at least one first axial image and the at least one second axial image;
generating a second concatenated image by concatenating the at least one first sagittal image and the at least one second sagittal image;
generating a third concatenated image by concatenating the at least one first coronary image and the at least one second coronary image; and
determining the model input based on the first concatenated image, the second concatenated image, and the third concatenated image.

16. The method of claim 15, wherein the image reconstruction model includes:
an axial view component configured to generate a first feature map by processing the first concatenated image;
a sagittal view component configured to generate a second feature map by processing the second concatenated image;
a coronary view component configured to generate a third feature map by processing the third concatenated image; and
an integration component configured to generate an output image by processing the first feature map, the second feature map, and the third feature map, wherein the target image is generated based on the output image of the integration component.

17. The method of claim 13, wherein the image reconstruction model is a trained cascaded neural network including a plurality of trained models that are sequentially connected, the plurality of trained models include a trained first model and one or more trained second models downstream to the trained first model, and the generating the target image by applying the image reconstruction model on the at least one first 2D image and the at least one second 2D image includes:
obtaining an output image of the trained first model by inputting the at least one first 2D image and the at least one second 2D image into the trained first model;
for each of the one or more trained second models,
extracting at least one third 2D image from an output image of a previous trained model connected to the trained second model; and
obtaining an output image of the trained second model by inputting the at least one first 2D image, the at least one second 2D image, and the at least one third 2D image into the trained second model, wherein the target image is generated based on an output image of the last trained second model of the trained cascaded neural network.

18. The method of claim 12, wherein the scan data of the initial image corresponds to a first radiation dose associated with the subject, and the target image corresponds to a second radiation dose higher than the first radiation dose.

19. The method of claim 12, wherein the image reconstruction model corresponds to a target image resolution, the initial image has an image resolution different from the target image resolution, and the method further includes:
- generating a resampled initial image having the target image resolution by resampling the initial image;
- generating a preprocessed initial image by normalizing the resampled initial image; and
- generating a preprocessed gradient image by normalizing the gradient image, and wherein the determining a model input based on the initial image and the gradient image includes:
- determining, based on the preprocessed initial image and the preprocessed gradient image, the model input.

20. The method of claim 12, wherein the image quality relates to at least one of an image resolution, a noise level, a contrast ratio, or a sharpness.

* * * * *